(12) United States Patent
Mertens

(10) Patent No.: US 10,057,600 B2
(45) Date of Patent: Aug. 21, 2018

(54) BRIGHTNESS REGION-BASED APPARATUSES AND METHODS FOR HDR IMAGE ENCODING AND DECODING

(71) Applicant: KONINKLIJKE PHILIPS N.V., Eindhoven (NL)

(72) Inventor: Mark Jozef Willem Mertens, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 46 days.

(21) Appl. No.: 15/221,804

(22) Filed: Jul. 28, 2016

(65) Prior Publication Data

US 2017/0208344 A1 Jul. 20, 2017

Related U.S. Application Data

(63) Continuation of application No. 14/387,575, filed as application No. PCT/IB2013/052349 on Mar. 25, 2013, now Pat. No. 9,420,288.

(60) Provisional application No. 61/615,409, filed on Mar. 26, 2012.

(51) Int. Cl.
  *G06K 9/00* (2006.01)
  *H04N 19/625* (2014.01)
  *H04N 19/14* (2014.01)
  *H04N 19/182* (2014.01)
  (Continued)

(52) U.S. Cl.
  CPC ........... *H04N 19/625* (2014.11); *H04N 19/14* (2014.11); *H04N 19/176* (2014.11); *H04N 19/182* (2014.11); *H04N 19/186* (2014.11)

(58) Field of Classification Search
  None
  See application file for complete search history.

(56) References Cited

U.S. PATENT DOCUMENTS

| 5,832,111 | A | * | 11/1998 | Florent | ........... | G06K 9/38 358/466 |
|---|---|---|---|---|---|---|
| 7,349,574 | B1 | | 3/2008 | Sodini | | |
| 8,289,412 | B2 | | 10/2012 | Banterle | | |

(Continued)

FOREIGN PATENT DOCUMENTS

| EP | 1107610 A1 | 6/2001 |
|---|---|---|
| EP | 2009921 A2 | 12/2008 |

(Continued)

OTHER PUBLICATIONS

Segall A. et al., "Tone Mapping SEI", 5750 NW Pacific Rim Blvd Camas, WA 98607 United States, JVT-T JVT-T060, Mar. 29, 2006 http://wftp3.itu.int/av-arch/jvt-site/2006_07_Klagenfurt/JVT-T060.zip.

*Primary Examiner* — Hadi Akhavannik
(74) *Attorney, Agent, or Firm* — Larry Liberchuk

(57) ABSTRACT

The image encoder encodes an image of a high dynamic range scene. A pixel texture encoding unit is configured to encode pixels colors of the image with an image representation comprising N-bit code words. An image analysis unit is configured to determine and output a region differentiator grey value, which is a luma value demarcating below it lumas of all pixels of a first object in at least one block of the image, and above it lumas of all pixels of a second object in the at least one block of the image. A formatter is configured to co-encode the image representation and the region differentiator grey value in an output image signal.

16 Claims, 9 Drawing Sheets

Figure 1A:
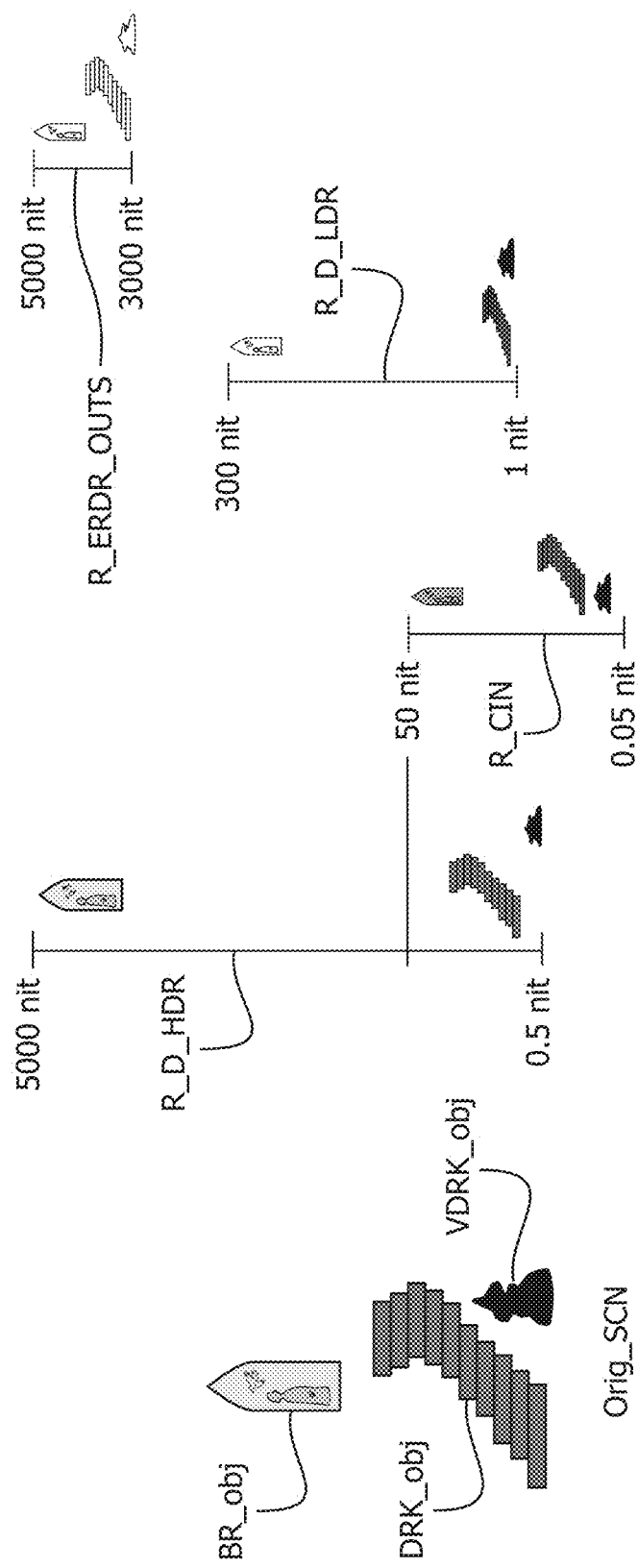

(51) Int. Cl.
*H04N 19/186* (2014.01)
*H04N 19/176* (2014.01)

(56) References Cited

U.S. PATENT DOCUMENTS

| | | | |
|---|---|---|---|
| 8,982,146 B2* | 3/2015 | Fergason | G09G 3/3611 345/102 |
| 2005/0199721 A1* | 9/2005 | Chang | G06K 7/1417 235/462.1 |
| 2006/0262363 A1 | 11/2006 | Henley | |
| 2007/0046687 A1* | 3/2007 | Soroushi | G06F 3/14 345/589 |
| 2009/0231460 A1 | 9/2009 | Wen | |
| 2009/0304298 A1* | 12/2009 | Lu | G06T 9/00 382/251 |
| 2010/0074328 A1* | 3/2010 | Zuo | H04N 19/172 375/240.03 |
| 2010/0172411 A1* | 7/2010 | Efremov | H04N 19/136 375/240.12 |
| 2010/0231689 A1* | 9/2010 | Bruls | H04N 13/0022 348/43 |
| 2010/0278424 A1* | 11/2010 | Warner | G06F 3/04842 382/173 |
| 2011/0235720 A1* | 9/2011 | Banterle | G06T 5/009 375/240.25 |

FOREIGN PATENT DOCUMENTS

| | | |
|---|---|---|
| WO | WO2010105036 A1 | 9/2010 |
| WO | WO2010132237 A1 | 11/2010 |
| WO | WO2011000392 A | 1/2011 |
| WO | WO2011002505 A1 | 1/2011 |
| WO | WO2011107905 A1 | 9/2011 |
| WO | WO2012004709 A1 | 1/2012 |
| WO | WO2012147018 A2 | 11/2012 |

* cited by examiner

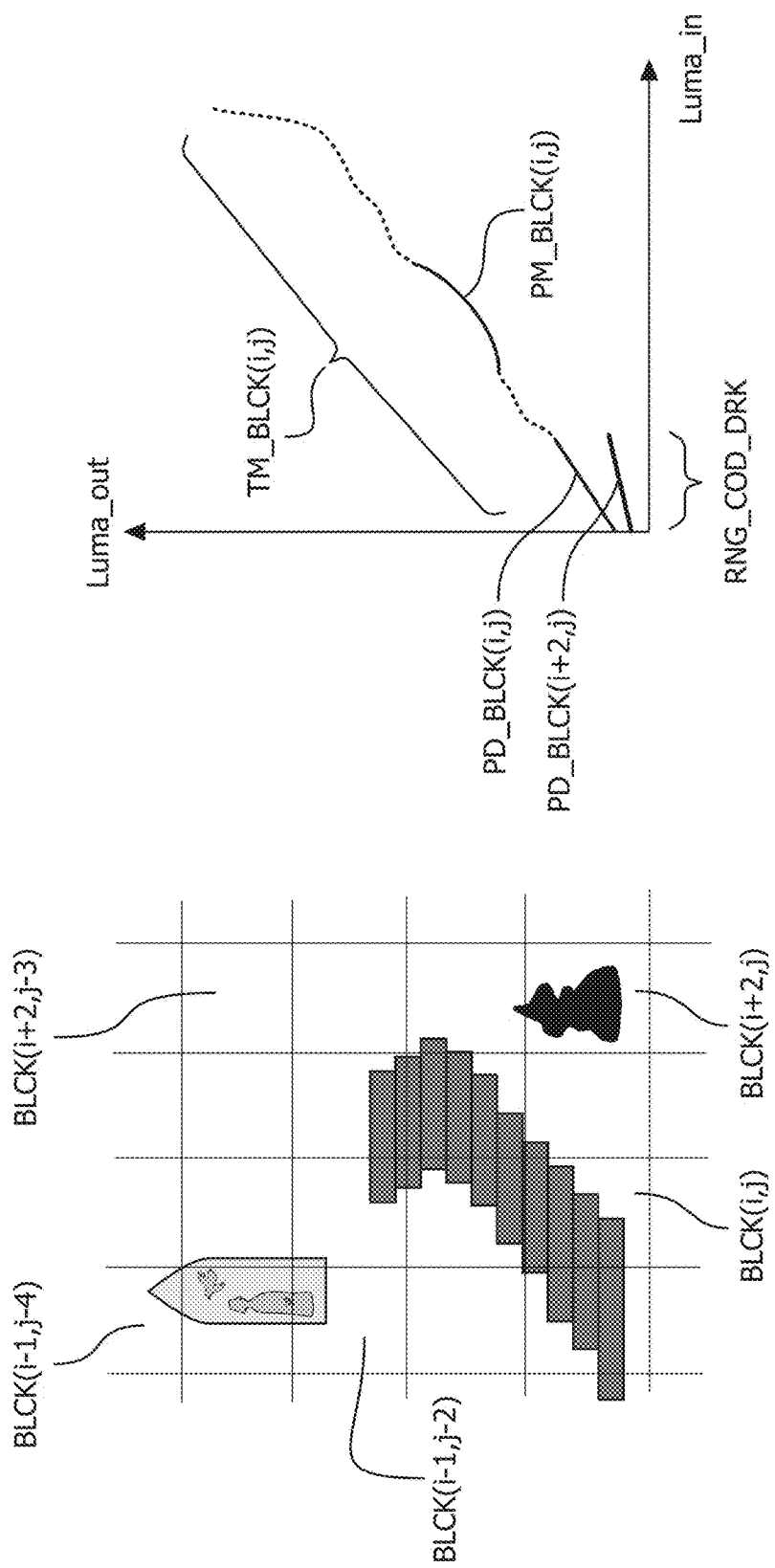

BRIGHTNESS REGION-BASED APPARATUSES AND METHODS FOR HDR IMAGE ENCODING AND DECODING

The invention relates to apparatuses and methods and resulting products like data storage products or encoded signals for improved encoding of at least one image or video, in particular coding of image(s) with an increased dynamic range compared to legacy images (called high dynamic range HDR images, and the legacy images are called low dynamic range LDR), and encoding of image information with an increased amount of lightness information (also known as high dynamic range) to or from various image representations.

Recently new developments have occurred regarding the encoding of images/video (whether of captured scenes or computer graphics), namely, it is desirable to better capture the entire range of object luminances and colors occurring in nature, up to large luminance values like e.g. 25000 nit (e.g. sunlit clouds) and often also low values like 0.01 nit, which is called HDR (high dynamic range) encoding. Until now, classical image capturing systems (i.e. the chain starting at the camera—and even appropriate scene lighting which was typically relatively uniform-followed by encoding for e.g. image storage or transmission, up to the display of the image) have handled high dynamic range scenes (i.e. scenes in which there are simultaneously important dark regions with low luminances and significant objects therein, and bright regions with high luminances, in particular if there also various important regions of intermediate luminances (various greys), in particular if several of those scene luminances may not easily map to what is usable by a component in the chain, such as e.g. a linear mapping based rendering on a display) in a severely distorting way. E.g. if the action was happening inside an enclosed volume of a first light level (illuminance), such as a car or room, regions of brighter lighting, such as the environment seen through the window may have been captured, or at least represented in the signal with very low quality (namely pastel, washed out or clipped colors). This is especially so for cheaper CMOS based cameras, compared to the more forgiving behavior of e.g. celluloid film. In particular, only a few hardly representative code values may have been associated with the objects in these bright regions, which may result in bad representation of the object textures, or even blunt clipping to the maximum value of the color space used for encoding. Having so little data in these regions of the luminance axis of the captured image, also means that processing functions e.g. optimizing displayed image contrast may have problems to produce good final pixel data. Having available ever better displays nowadays and in the near future (e.g. with peak brightness of several 1000 s of nits), or at least smarter image processing technologies, one may desire to improve upon that situation, to be able to create rendered images of higher quality.

For several reasons, at least for a number of years into the future, one may desire some form of backwards compatibility, which means that data of a so-called low dynamic range (LDR) encoding must be available or at least easily determinable from the available encoding, so that e.g. a novel upgraded video processing box can deliver an LDR signal to a lower dynamic range display (e.g. a mobile display). Also from a point of view of storage, it may be very useful to store an image signal in as versatile as possible a manner, i.e. not just with the maximum amount of useful data about the scene, but also in a manner that this data will serve many potential future applications, especially if in a simple way. Typically the shooting of a movie e.g. takes so much effort, that the raw signal is highly valuable, and one better encodes this in the best possible way a technology allows. Not to fall in a trap that even the master encoding of a program is for a later generation of better quality display systems below what could have been achievable if the data was encoded differently. That avoids not only having to do an expensive stunt all over, but the reader can imagine that some to be recorded events like the marriage of a royal couple or a wedding video of a normal couple won't be done over. And trying to remaster such a video for a new generation of display technology is, if not very difficult, at least cumbersome. It is preferable that the encoding allows capturing the scene optimally in the first place, and even easily allows for later improvements, by its very encoding structure. Independent from how it is rendered on a particular display plus viewing environment, the information present in current LDR encodings such as JPEG (depending inter alia on the particular captured scene and used camera system), is currently seen as (limited to) approximately 11 linear bits or stops. Of course if encoding is to be used directly for rendering (e.g. display-referred) some of the information bits may not be visible. On the other hand, a codec may contain information from the original scene or graphics composition (scene-referred), which can become relevant e.g. when a display is changing its human-visible gamut by means of image processing. So it is important to have at least the more important image objects well-represented in the coded image.

A HDR capturing chain is more than just pointing a camera at a scene with a large luminance contrast ratio between the darkest and the brightest object and linearly recording what there is in the scene. It has to do with what exactly the intermediate grey values for all the objects are, since that conveys e.g. the mood of a movie (darkening already some of the objects in the scene may convey a dark mood). And this is a complex psychological process. One can e.g. imagine that psychologically it isn't that important whether a bright light is rendered on a display exactly in such proportion to the rest of the rendered grey values as the scene luminance of that light was to the rest of the scene object luminances. Rather, one will have a faithful impression of a real lamp, if the pixels are rendered with "some" high display output luminance, as long as that is sufficiently higher than the rest of the picture. But that distribution between self-luminous and reflecting objects (in the various illumination regions of the scene) is also a task depending on the display gamut and typical viewing conditions. Also one may imagine that the encoding of the darker regions is preferably done so that they can be easily used in different rendering scenarios such as different average surround lighting levels, having different levels of visibility for the darker image content. In general because this is a difficult psychological task, artists will be involved in creating optimal images, which is called color grading. In particular, it is very handy when the artists make a separate LDR grading, even if that is done in a "pure HDR encoding strategy". In other words in such a scenario when encoding a sole HDR camera RAW signal, we will still also generate an LDR image, not necessarily because it is to be used for a large LDR fraction of the video consumption market in the future, but because it conveys important information about the scene. Namely there will always be more important regions and objects in the scene, and by putting these in an LDR substructure (which can conceptually be seen as an artistic counterpart of an automatic exposure algorithm, yet after the full capturing, and in relation to captured luminances outside that range), this makes it more easy to do all kinds of conversions to intermediate range representations (MDR), suitable for driving displays with a particular rendering and viewing characteristics. By using such a technical framework, we can even with a single encoding image, at the same time taylor for e.g. LDR displays like a mobile display with a peak brightness of 50 nit (indoors, or a higher brightness but competing against high outdoors illuminance), a mid range peak brightness MDR display of say 1200 nit, and a HDR display of say 8000 nit peak brightness. In particular one may tune this LDR part according to several criteria, e.g. that it renders with good quality on a standard reference LDR display (the colors look similar as far as possible to those on the HDR display), or conveys a certain percentage of the total captured information (e.g. a certain amount of the image is visible), etc. We will in our below proposed codec implement that such receiving display can from that single all-encompassing scene encoding (or grading) can easily identify what are e.g. the dark regions, so that it can optimally taylor the incorporated visibility thereof given its known characteristics of the displaying system.

There are not so many ways to encode a HDR signal. Usually in prior art one just natively codes the HDR signal, i.e. one (linearly) maps the pixels to e.g. 16 bit float words, and then the maximum captured luminance value is the HDR white in a similar philosophy to LDR encoding (although psychovisually this usually is not some reflective white in the scene, but rather a bright color of a lamp). This is a native scene-referred encoding of the original scene object luminances as captured by the camera. One could also map a full range HDR signal to the 8 bit LDR range via some "optimal" luma transformation function, which would typically be a gamma function or similar. This may involve losing color precision (in view of the trade-off between range and precision for such encodings) with corresponding rendering quality issues, especially if at the receiving side image processing such as local brightening is expectable, however the dominant grey value grading of the image objects (e.g. the average over an object) is roughly preserved (i.e. their relative/percentual luma relationships).

Prior art has also taught some HDR encoding techniques using two picture data sets for each HDR image, typically based on a kind of scalable coding concept, in which by some prediction function, the precision of a "LDR" encoded local texture is refined, or stated more accurately, i.e. projected to a HDR version of that texture, typically by scaling the LDR luminances (the LDR in those technologies is normally not a good looking LDR grade already suitable for optimal rendering on a typical (reference) LDR display, but typically a simple processing on the HDR input). Then the second picture is a correction picture for bringing the predicted HDR image close to the original HDR image to be encoded. There is some similarity to the single HDR image encodings, through the prediction functions serving as some range/precision definition criterion, only in these technologies the encoding is performed with two pictures.

Scaling the lumas of a base-band image involves applying a transformation, and this predicting transformation is often defined per block, to reduce the amount of data to be encoded. This may be already wasteful data-wise, since many blocks will contain the same object, and hence need the same transformation.

As said the difference of the original HDR image with the prediction may be co-encoded as an enhancement picture to the degree desired, yet as far as possible given the range and definition of the enhancement image. E.g., one may represent a HDR gray value of 1168 with a division by 8 to a value 146. This HDR value could be recreated by multiplying by 8 again, but since a value 1169 would quantize to the same base layer value 146, one would need an enhancement value equal to 1 to be able to recreate a high quality HDR signal. An example of such a technology is described in patent EP2009921 [Liu Shan et al. Mitsubishi Electric: Method for inverse tone mapping (by scaling and offset)]. An interesting question about such methods is always what the enhancement method actually brings as visual information improvement. It is normally applied blindly, and may e.g. for textured regions sometimes not contribute relevant additional information, especially for fast changing video.

Another two-picture encoding is described in the currently not yet published application U.S. 61/557,461 of which all teachings are hereby incorporated by reference.

Now there are problems with all the existing HDR encodings. Just applying global transformations may be much to coarse according to what the content creator desires after having invested so much in e.g. a movie (special effects). Other applications may be less critical like a television program making, but still good control over the final look is desirable. That would at least come at the cost of needing many encoded data bits. On the other hand specifying intricate transformations per pixel also involves a large amount of data to be encoded. This applies to e.g. needing to encode a second image being a lightness boost map, for object texture reflections being encoded in a first image. Also, herewith one blindly encodes anything possibly occurring on the input, not knowing much about what is actually in the image (i.e. not allowing versatile use), even not realizing there may be a large amount of redundancy in the boost image. Let alone that this blind data is easy to use for smart algorithms like e.g. picture improvement or optimization algorithms at the display side.

Working on a block basis reduces the amount of data, but still is not optimal. In particular this block structure also being rather blind to the actual image content, and more annoyingly, imposing a new geometric structure being the block grid, which has nothing to do with the underlying image, and may hence match more or less conveniently with the image characteristics (in particular the image geometry), means that several block-coding related artifacts may occur. In fact a block is not much more than just a large pixel, and not really a smart content-related structure (neither as regards the color-geometrical structure of that object or region, nor its semantic meaning, such as it e.g. being an object which should be mostly hidden in the dark).

The below embodiments aim at providing easy technical measures to mitigate at least some of those artifacts.

A simple and easily usable encoding of HDR images may be realized by embodiment concepts presented herein following principles related to an image encoder (549) for encoding an image of a high dynamic range scene, comprising:

a pixel texture encoding unit (552), arranged to encode pixels colors of the image with an image representation (Im_1) comprising N-bit code words;

an image analysis unit (550) arranged to determine and output a region differentiator grey value (gTS), which is a luma value demarcating below it lumas of all pixels of a first object in at least one block of the image, and above it lumas of all pixels of a second object in the at least one block of the image; and a formatter (554) arranged to co-encode in an output image signal (S(Im_1, MET(gTS)) the image representation (Im_1) and the region differentiator grey value (gTS).

Just with only one or a few such region differentiator grey value(s) one can already convey the essential characteristic of an HDR scene, such as that there is an "above_white" or "overbright" region in the image. Above white means scene luminances above the white in the normally illuminated region, e.g. the white that would be recorded from a normally (as according to the set lighting designer e.g.) illuminated white paper, in the main part of the scene. The differentiators are a nice way to co-encode the semantic content of a scene. E.g., there is not just one white in a real scene, as the classical image encoding assumes. In classical LDR image encoding, one indeed illuminates the scene where the action occurs approximately uniformly, and then the whitest reflecting object (in the brightest illumination of the main image region) will typically determine the white point of the image encoding. Instead of clipping e.g. outdoors objects, one might also include some above white objects, e.g. by the cameraman specifying a particular knee-point for the reproduction gamma curve, but that is still linked to the main white (e.g. 6×over that white). In an actual scene, there may be e.g. a very bright sunny outdoors. Even when cramming these two regions together in a lesser amount of bit encoding (e.g. representing it as an 8 bit classical picture), one would like these two regions/ranges separated from each other on the luma axis. This means that later (or e.g. intermediate in transcoding or automatic regarding etc.) one may more smartly treat these regions. We already talked about lamp objects above. The rendering display may want to render them according to a criterion defining one or more of "as bright as it can" and "not too dazzling for the viewer though". To do this however, it may need to treat those two image regions (lamp vs rest of the scene) differently and even discontinuously, and therefore it may need to know what in the image is that lamp object. Classical gamma-function based encodings will typically move the lamp during post processing to some rendered luminance position which is dependent on that used gamma, but not the scene semantics together with the rendering system colorimetric specifics (such as display capabilities, surround light, etc.). A similar technical reasoning may be made for the darker regions, if one knows their composition luminance-region-wise, i.e. e.g. a couple of ranges of dark, e.g. "bright dark", "average dark", and "superdark". Such codes (i.e. grey value differentiators) could mean something numerically, but our method allows the color grader, making e.g. the final master HDR for storage on say a blu-ray disk, to collocate them with semantically meaningful regions. E.g., in a dark basement of a horror movie, average dark may be the colors with which the walls are to be rendered (ultimately on the rendering display, according to its final optimal tone mapping for display optimality), whereas bright dark (i.e. the to be rendered luminance range between average dark and bright dark) might be tools on those walls like knives and instruments of torture to make them better visible (given rendering side colorimetric specifics), and superdark may e.g. be a dark corner, wherein the criminal may be hiding. The superdark corner region is then our first object, and the average dark main region our second, just as in an indoors/outdoors scene, the sunny outdoors may be the second object, and the indoors the first/main object.

Also, these two subregions (e.g. average illuminated main action and lamp or sunny outdoors) may be so close together in the encoded image representation to be actually touching in order not to waste luma codes in between, which makes them extremely difficult to separate blindly at the receiving side. Yet there is this particular luma value which marks the boundary between them, which is hence co-encoded as a region differentiator grey value (gTS) for easy (yet simple) scene understanding at the receiving side. And this then allows various applications, such as HDR encoding and easy reconstruction from an 8 bit image at the receiving side, image processing such as color remapping, etc.

Advantageously the image encoder (549) comprises a luma mapping determination unit (553), arranged to determine a luma mapping (TOM) for at least one of the first and the second object defining a mapping between pixel lumas as encoded in the image representation (Im_1) and lumas of the pixels in a second image representation (IM_RC_HDR), and arranged to supply the luma mapping (TOM) to the formatter (554) which is arranged to co-encode it into the output image signal (S(Im_1, MET(gTS), TOM). Such luma mappings may be determined in various ways, taking into account such principles as on the one hand optimal specification of the information in the picture (e.g. the amount of codes needed to encode relatively faithful a texture of a specific complexity, like a graininess of wood), and on the other hand a look by e.g. defining a luminance position on typically a reference display.

The content creator could leave it up to the receiving side to do its desired processing, e.g. ultimate display rendering. Just having one gTS suffices already for many situations, since the receiving side system then obviously knows what are the bright objects, since they have lumas above gTS. However, this system of co-encoding region differentiator grey value(s) allows for much more versatile encoding of HDR scene (knowledge about their composition or even semantic meaning in metadata) and consequently various use of that data. E.g. the content creator may provide one or more scenarios on how to map the pixel colors/lumas encoded in Im_1 to various other color spaces, such as for rendering on different displays. He may encode e.g. several values for (approximately) one type of display (e.g. having a peak brightness near to 4000 nit, i.e. intended for LCD or OLED displays with actual peak brightnesses between 3000 and 5000 nit), so that display can ultimately choose a final rendering strategy from all the encoded transformation knowledge (codifying how the content creator desires that his images ultimately look). E.g. on displays with a lesser displayable dynamic range, a single differentiator for the brighter regions may already suffice, since it has not such a high capability of rendering bright regions. However, a 8500 nit display may make much more advantageous use of the content if it contains more gTS values indicating different kinds of bright region, since it may knowing its physical renderable subgamut of bright luminances allocate a different luminance subrange to e.g. outdoors sunny objects as to e.g. lamp objects of a first kind, and an even brighter region near peak brightness for a brighter class of lamp objects.

A content creator with a lesser interest in investing much time in the grading may e.g. only specify two gradings, e.g. he may start from Im_1 or some automatic transformation thereof, as being "sufficiently good" for LDR rendering, and then take some time to tweak the mappings to obtain an improved HDR image (e.g. with extra bright outdoor regions, lights, or windows). So he may specify e.g. an 8 bit LDR image (which we will call LDR container), and then some functions, firstly mapping functions to approximately recover the original master HDR image (e.g. in a native float 16 bit encoding) from the LDR_container, as well as secondly some functions allowing one or more tunings of that HDR image. E.g., he may specify a mapping of the bright regions above e.g. 90% for displaying on a second reference display of 14000 nit (the first reference display may be the display for which the original master HDR grade was graded before coding it with an LDR container by down-mapping, e.g. a 5000 nit display). Similarly these functions may be used for downtuning to MDR displays of around 2000 nit, e.g. by inverting their mapping behavior. In the simplest variants the grader investing less time may just specify one or more gTS values for at least some scenes in the movie, and leave it up to the display or renderer (e.g. printer) to figure out what a good transformation for its rendering characteristics would be.

A receiving side image processing apparatus may then e.g. determine its final grade from these two or more sets of information (the encoded LDR container picture in Im_1, and the at least one differentiating grey value gTS, and if available whatever mapping function information the grader specifies is according to his desires). E.g., looking at FIG. 2b, the content creator may prescribe in the signal that for HDR rendering of the very dark object, the partial mapping PD_BLCK(i+2,j) is to be used (explained in detail below), and that for LDR rendering the brighter mapping PD_BLCK (i,j) may or should be used (i.e. the very dark object is then treated as the stairs). Now a receiving display of say 1500 nit peak brightness may decide to use either of these two strategies (e.g. the closest to its peak brightness, the LDR grading/mapping being for at most 750 nit (so probably more for 400 nit) and the HDR for at least e.g. 2000 nit), or may interpolate between them in some manner, which would for these two linear function e.g. mean applying the linear function halfway between them. The system allows the content creator to see the HDR as "HDR effects" e.g. boosting a bright light, like a plasma ball emitted from a wizard's hand.

Our method can be used when the Im_1 encoding is an encoding of lesser bits (which is not the same as lesser dynamic range) than the original image (master HDR), e.g. with a classical 8 or 10 bit luma encoding. In this case, that image Im_1 may be defined for a reference display of a lower dynamic range (and peak brightness typically, e.g. 500 nit) and differentiators gTS may be useful to determine automatically gradings for higher display dynamic ranges (e.g. for a display with peak brightness of 2000 nits). But similarly of course the single encoded image Im_1 may be specified e.g. for that 2000 nits reference display (i.e. directly usable for driving that display, or at least requiring minor colorimetric modifications before rendering), and in such a scenario the gTS values (and other data like transformation functions specifications) may be useful inter alia to downmap to obtain driving images for lower dynamic range displays, like e.g. a portable display.

I.e. advantageously the image encoder (549) operates in a usage scenario and technical configuration so that one of the first and second image representations is a high dynamic range representation, the HDR representation being encoded e.g. for a reference display with peak brightness at least above 750 nit. I.e. it will be usable without large further modification for driving a HDR display to render the image approximately as the artist intended. Such a HDR representation may e.g. be a 3×32 bit integer or 3×16 bit float representation (RGB, or YC1C2, etc.), etc. Although this encoding strategy can be used in various scenarios between various color space representations (e.g. between a first 16 bit HDR representation with first white, gamma function allocating the luma codes etc. and a second e.g. 12 bit HDR representation), it is especially useful if at least one of the images (in- or output) or at least part of the images is high dynamic range (i.e. whether so coded or so obtained usable for with high colorimetric quality driving a HDR rendering display, etc.), and in particular it is useful when HDR is encoded with luma words of few bits (i.e. e.g. 8 or 10 instead of e.g 14 or 20), in which case it can be used in systems of legacy capabilities or capabilities close thereto. For completeness of explanation, the recent commonly known technical term high dynamic range typically means higher brightnesses in original scene or rendering, higher than in the classical current LDR imaging scenarios, or even more exact as described below: a larger range of lightness appearances (e.g. according to the human visual system of a viewer, but of course embodied in technical codes like lumas). Although one may well define such a signal display-referred with reference to an ultimate display of capabilities which are maximum for expectable technologies in a reasobly far future, ideally the HDR image is defined at least partially scene-referred (as one never knows what a future display will do to exploit the encoded content, and raw aficionados would say the image needs to store at least what a potentially very high quality camera or graphics program can capture or produce), but even then instead of using a reference camera model, one may still encode this as the scene which is approximated by a very high quality display thereof. In fact, any encoding between 0 and Lmax, with whatever code allocation function, can also be seen as renderable on such a theoretical display having a peak brightness of Lmax, and even in the far future given the fixed limitations of human vision one would never actually need to render the luminance of the sun faithfully, not on large wall-encompassing displays, and especially not for smaller displays on which all image content is seen in a small solid angle. So the grader may choose to encode the image with whatever reference display he desires, whether an ultimate theoretical one of 500,000 nit peak brightness, or a more pragmatical one like 10,000 nit, as long as he co-specifies this colorimetry defining metadata in his codec definition.

Advantageously the image encoder (549) is arranged so that it encodes several region differentiator grey values (gTS_D_Loc_1, gTS_D_Loc_2) in between sections comprising several of the N-bit code words encoding the pixel colors from the image representation (Im_1). This allows that the creator (or automatic processing software even) can allocate e.g. different values of e.g. the "most dark shadow parts" for different parts of the image, and so have higher control over the tunability of the image. E.g., in a central geometrical region in the image one can (un)hide the darker objects which are defined as below e.g. code value 10, and in a corner the darkest objects are below code value 5. This may handle various physical situations, like e.g. geometrically changing illumination, where the relationship between dark and darkest object pixels may change several times for blocks succeeding a redefinition of a local gTS. The actual encoding of the region differentiator grey values in physical relation (e.g. on a carryable memory) to the image texture data (Im_1) can be done in various ways, but it is advantageous if the required metadata is encoded interspersed with the pixel color block data, precisely at these locations where it is applicable, i.e. typically before the first block in a picture which has a dual relationship of grey values below and above gTS(to be used for segmentation or processing of the following blocks typically).

Advantageously the image encoder (549) is arranged in that it encodes a region differentiator grey value before a run of several successive images, this being a region differentiator grey value for all those successive images. Of course the more important region differentiator grey values can be encoded at less regular intervals, since they may be applicable e.g. to an entire shot or scene. E.g. one may encode several strategies for encoding the darker areas for different rendering environments for a dark scary horror part of a movie. Later on in the movie, in an outside day scene, one may separately encode a predominantly to be used brightening strategy for the sky, before the first image of that scene. This allows specifying processing on a shot or scene basis, e.g. defining the darkest parts of a basement, and such a definition may reoccur after an intermittent shot of say outside in between two dark basement shots.

Advantageously the image encoder (549) is arranged in that it encodes at least one region differentiator grey value in a memory not physically adjacent to a memory storing the image representation (Im_1), together with a geometric association code allowing association of each respective at least one region differentiator grey value with a geometrical region of the image representation (Im_1) to which it is applicable, the geometric association code typically comprising at least the coordinates of a block of the image representation (Im_1). This allows e.g. for remastering or viewing experience services. A company can take e.g. legacy movie (or even a program or game etc. already processed according to the present principles), and let graders do a new analysis of the images. The may then save the region differentiator grey values, and new mapping functions, etc. e.g. on a server on the internet. The viewer can then choose e.g. to view the movie under the "Artist_X new grade" by downloading the metadata from that server (potentially overriding any existing demarcation and/or grading metadata). This option could e.g. be offered through the user interface upon starting the movie. Various grey differentiators gTS allow cospecification of various intended processing functions, and this structure can be handled parametrically for easy respecification of e.g. final rendering device colorimetric mappings, or regradings of the data (which needn't change the Im_1 code) etc. E.g. three gTs codes in the darker luminances subrange may not be needed for a first processing strategy, which may be just a linear on non-linear stretch over all luminances between gTs1 and gTs3, but a second gTS2 specification of an intermediate region can be used in more complicated mapping strategies. E.g. the rendering side display can elect to process the luminances between gTS2 and gTS3 giving good visual contrast, but nearly clip the values below gTS2. A transcoder or similar intermediate apparatues may e.g. apply a soft-clipping on the luminances between gTS1 and gTS2 which still contains some information of the original capturing, though with little precision as this will be dark regions hardly visible on most displays anyway, i.e. needing less coding quality. The creator has in this way used gTS2 to specify additional semantic information about the imaged scene, namely which darker parts of the image are less relevant. Separate structures can be more complex than metadata interleaved with the pixel data blocks, and manipulated more freely.

Advantageously the image encoder (549) is arranged in that it encodes a first reserved value of a region differentiator grey value into the output image signal (S(Im_1, MET (gTS)), indicating that, for at least one geometrical region of the image representation (Im_1), lying according to a scan direction through the image beyond a location identifiable with the first reserved value, a transformation from the pixel values as encoded in the image representation (Im_1) to pixel values in a second image representation (IM_RC_HDR), is performed according to a predefined algorithm.

Special values for the region differentiator grey value, like e.g. "0" or "−1" (clearly not being a valid luma on the [0,255] range) may indicate that the following region of the scene is to be treated differently. E.g. in an encoding, the decoder may be referred to a very different part of the image signal (e.g. a different sector of a connected detachable memory), which is now to be consulted to obtain the final output signal (e.g. some images may be encoded according to some two layer technology for some reason, like e.g. different signal characteristics, or origin, etc.). In that case the encoder may e.g. copy such a block of that second memory sector to the local position, e.g. in Im_1 potentially before doing a further transformation thereupon, or alternatively as final luma values. When processing the image the output lumas could be obtained partly by applying a computer graphics rendering algorithm. Or such a code may indicate that a further image transformation has to be applied to change the local pixel lumas or texture look. The region could be anything provided the scan path (bringing the algorithms to some starting location (x,y) in the image, i.e. that is the identifiable location) is supplemented by some further metadata specifying the region, e.g. it may be an ellipse starting or having its centre at an offsetted position from (x,y). Typically however the embodiments will be used advantageously in a block based system, in which case e.g (some of) the successive 16×16 pixel blocks are the geometrical region.

Advantageously the image encoder (549) is arranged in that it encodes a second reserved value (gTR) of a region differentiator grey value into the output image signal (S(Im_1, MET(gTS)), indicating that for at least one successive image, a display should render it with a maximal output luminance below a predetermined value. E.g. a value 255, or 260 may indicate that a part of an image, or several successive images, are to be rendered with decreased brightness to save power.

Advantageously the image encoder (549) has the luma mapping determination unit (553) arranged to determine several different luma mappings (TOM) for at least one of the first and the second object through transformation linking rules, or is arranged to indicate with a processing indicator (PROC_IND) that several different luma mappings may be used for transforming the pixel colors of at least one of the first and the second object to a new color representation of the second image representation (IM_RC_HDR). Because now the various relevant (different brightness) objects are easily identifiable in the scene as encoded in any image representation, it is also easy to transform them in any desirable way. E.g. several different color transformation strategies could be applied to say a highly bright object, for several intended different rendering displays, or surround illuminations of the viewing environment, or user preference settings, etc. E.g. some displays with high peak brightness i.e. high level capabilities in rendering brighter subregions of the image may use a final mapping close to or inspired by a first strategy having a contrasty appearance for the brighter regions as defined by a first mapping strategy, whereas lesser quality lower peak brightness displays may follow exactly or approximately a second mapping strategy which has a diminishing effect on the interluminance distances of at least some of the pixels of such a bright region. And these transformations could be (partly) co-encoded with or in the image signal, or (partly) left up to any receiving side (whether final or intermediate), in which latter case it could be useful if the image signal contains some rough indications of which kinds of transformations are or vice versa aren't desirable, etc. Note that depending on the further use, one or more of the mappings may specify transformations to be followed exactly, versus transformations which are a rough indication of what the final rendering display should do. The former case will typically occur e.g. in case the mapping actually encodes some accurate grading (like e.g. a master grade from an 8 bit LDR container encoding thereof), and the latter case may apply when the transformation is a further transformation indicating how that master pixel luma data can be further optimized for several kinds of displays. E.g. a lower peak brightness display may study the functional curve of a soft clipping strategy (which may be specified between several important semantic gTS values) and then use an ultimate tone mapping which approximately maintains the prescribed visual look.

On the receiving side one may construct a largely mirrored technology of the encoder side, being an image decoder (605) for decoding an encoded image representation (Im_1, MET) of a high dynamic range scene, comprising:

a pixel texture decoding unit (608), arranged to obtain from the encoded image representation (Im_1) pixel colors inclusive data representing luminances of pixels of a decoded image (IM_INTRM); and a deformatter (607) arranged to extract from the encoded image representation (Im_1, MET) a region differentiator grey value (gTS).

This at least one region differentiator grey value gTS may then be used for further image processing, such as e.g. the determination of the final optimal color mapping for the given rendering display and environment. So our method is a nice way of linking the original display-independent color encoding and the final display dependent color encoding, which may as purpose have e.g. that it should render colors in the display viewing environment approximately as they would have looked to a human viewer in the original scene. The actual image encoding may be very different therefrom (since we typically encode it with reference to some realistic reference display already, which however may be very different from the actual rendering situation still: e.g. master HDR image was encoded for relatively dark surround home viewing conditions, and that home television then finetunes it for the final somewhat lighter conditions; however: much of the complexity is already done in the master grade towards one or more realistic reference viewing displays, leaving a simpler final color transformation strategy to the display), however, since normally there will be no inversion of the order of pixel luminances, a nice way to characterize the scene as imaged further, and allowing easy display situation tenability is by splitting it semantically into luminance/luma subparts, especially those which will typically be important and highly variable as to their appearance on several display scenarios, like e.g. the darkest or brightest regions of the image. Note that we may use the word luma to specify all mathematical operations like e.g. segmentations, since such a luma will be related to actual luminance (e.g. when the image is outputed on the reference display) via some encoding mapping strategy, which is a—potentially discontinuous-generalization of a gamma mapping like gamma 2.2.

Advantageously this image decoder (605) comprises an image segmentation unit (606) arranged to use the region differentiator grey value (gTS) to obtain a segment of lower luma and a segment of higher luma in the decoded image (IM_INTRM), i.e. does the image understanding separation based on the region differentiator grey value(s), so that later processing like e.g. optimized noise processing can be done differently for regions which are ultimately differently rendered (with e.g. less visibility of the noise in the darker parts).

Advantageously the image decoder (605) comprises a pixel color transformation unit (609), arranged to apply a first color transform (PD_BLCK(i,j)) transforming at least luma values of the pixel colors to pixels of e.g. the recovered master HDR image in the segment of lower luma, and arranged to apply a first color transform (PM_BLCK(i,j)) transforming at least luma values of the pixel colors to pixels in the segment of higher luma. So one can determine e.g. an optimal driving picture to be rendered on a display of higher dynamic range (low and high and lower and higher will be understood by a skilled reader to refer to each other, e.g. if a color encoding of image pixels is for a reference display of 350 nit, transforming it into a representation intended for a reference display of 2000 nit, means that this second image is for higher brightness, or differently stated higher dynamic range than the original image). Such a separation means much higher quality yet simple encoding. If one had to encode the full image with a single strategy, one may arrive only at an approximate look by averaging out all kinds of mistakes (e.g. a face has to be bright, but then the dark basement brightness becomes too high, so we darken the face somewhat below the ideal, and the basement is only a little too bright). Now however we can e.g. darken the basement as we desire, and then locally correct for the face by defining it with thresholds and an update strategy. Also this partial definition makes it easy to change just some of the mappings. E.g. through several images of a shot of the basement scene, because of light changes and/or camera motion, the PM_BLCK(i,j) may stay suitable for the entire scene, yet the capturing (or needed appearance) of the darker parts may change as we go through the successive pictures of the shot. We can then load a different PD_BLCK(i,j) function after e.g. the fifth image of the shot, counteracting that that dark corner has from now on become somewhat brighter, and needs a mapping strategy which appropriately counterdarkens it, also of course using the appropriate functional shape of PD_BLCK(i,j) to handle the textural visibility etc.

Advantageously the image decoder (605) is arranged to apply a specific color transformation strategy to the pixel colors of at least one of the first and the second object if the deformatter (607) extracts a region differentiator grey value (gTS) of a reserved value, such as e.g. a value of 0 or 255. Again these reserved values when detected anywhere in the inputed signal can be used to immediately revert to any fallback processing strategy. Typically further details will be available on what fallback to apply (though not necessarily, since the receiver may just perform anything by itself based e.g. on image analysis). E.g., if the image signal comes stored on a memory, there may be a sector of successive fallback strategies (e.g. algorithmic code defining image processing methods, and its required data), and then each time a special fallback reserved code is detected, the receiving image processing apparatus jumps to the next fallback method to apply it. Or the codes may refer to which fallback to apply (potentially many times), e.g. 260 indicates that the first stored algorithm should be used, 261 the second, etc.

Advantageously the image decoder (605) comprises a transformation determination unit (610) arranged to select a pixel color transformation strategy from a memory source not associated with any of the data of the encoded image representation (Im_1, MET). In this manner the receiving side decoder has more versatility to decide what it is going to use for transforming the pixel lumas. E.g. it may take functions from its own memory, and decide e.g. depending on the properties of an identified object, such as its average luma. Or it could taking functions over a network connection, potentially determined at run time by a server. The signal may still partially guide this, by specifying that it is desirable to apply (any) darkening mapping e.g. (i.e. a transformation which has as a visual result that the object looks darker in some way, e.g. average brightness in conjunction with a contrast modification, and/or an increased area in the object of very dark e.g. clipped to black pixels etc.), in which case the rendering side should preferably not apply a mapping which brightens the very dark object (taking into account visibility due to surround illumination etc. of course). Ultimately the receiving side, whether under specific control of the viewer or not, may of course decide to (partially) comply with this desired co-encoded guidelines or ignore and traverse them. Typically though the image encoding (e.g. the disk on which it is encoded) may e.g. prescribe that the transformation such not be ignored nor even relaxed, but should be strictly followed, or vice versa not strictly followed.

Advantageously image decoder (605) is characterized in that transformation determination unit (610) is arranged to determine the pixel color transformation strategy on the basis of at least one parameter of the rendering environment, such as a characteristic of the display, or a level of surround illumination, or the pattern of colors as seen reflected on the front screen of the display by a camera, etc. So again the receiving side apparatus can at least partially optimize the mappings based on important information only available definitely at its side. A content creator may specify its mappings to be used under the assumption that a certain display and viewing environment (e.g. most living room lights switched off, with only some atmospheric lighting, which may indeed by approximately realized in actuality with the viewer having e.g. a living colors lamp on the floor at the side of the viewer), but ultimately the rendering side may change them, be it even minor finetuning (which is the ideal case). Although such an amount of precision is usually not needed, the content creator could specify in the signal that e.g. PD_BLCK(i+2j) was intended for the case there was a luminance of say 1 nit around the display, in which case if the rendering display measures 2 nits, he may decide to slightly change the slope of PD_BLCK(i+2,j). In any case this may be useful information for processing algorithms at the receiving side.

The described embodiments can be realized in various ways, e.g. by a method of image encoding for encoding an image of a high dynamic range scene, comprising:
  encoding pixels colors of the image with an image representation (Im_1) comprising N-bit code words;
  determining and outputting a region differentiator grey value (gTS), which is a luma value demarcating below it lumas of all pixels of a first object in at least one block of the image, and above it lumas of all pixels of a second object in the at least one block of the image; and
  co-encoding in an output image signal (S(Im_1, MET (gTS)) the image representation (Im_1) and the region differentiator grey value (gTS).
  Or by a method of image decoding for decoding an encoded image representation (Im_1, MET) of a high dynamic range scene, comprising:
  obtaining from the encoded image representation (Im_1) pixel colors of pixels of a decoded image (IM_INTRM); and
  extracting from the encoded image representation (Im_1, MET) a region differentiator grey value (gTS).
  Or as a computer program comprising software code enabling a processing to execute any of the methods corresponding to the taught embodiments, which software may be bought on a disk or other tangible product, or downloaded over a network, etc.

Typically the encoded knowledge about the imaged scene will travel from one locus/apparatus to another (whether they are units within a same consumer apparatus or system of connected apparatuses at the same site like e.g. an image receiving or processing box and a television or display connected via e.g. HDMI, or services running on apparatuses in different countries) i.e. by means of an image signal encoding the colors of regions of a high dynamic range scene, comprising N-bit code words encoding at least the luminances of the colors of regions, and a region differentiator grey value (gTS), indicating in the code system used for encoding the N-bit code words which encode at least the luminances of the colors of regions, a demarcation between at least one geometrical region of pixels of higher luminance in the high dynamic range scene or higher values of the N-bit code words encoding those, and at least one geometrical region of pixels of lower luminance in the high dynamic range scene or lower values of the N-bit code words encoding those. The code system is the technical-mathematical representation defining a derivative from a scene luminance (through camera capture) and ultimately a to be rendered luminance, typically through a physical quantity called luma, which is defined over an axis, and typically with a digital code word covering the extent of the axis (e.g. between 00000000 and 11111111), or a float number between 0.0 and 1.0, and with an allocation function (typically a gamma function) mapping such luminances non-linearly to luma. There may typically be further information associated with the code system, such as with which to be rendered peak luminance the maximal code value corresponds. When we talk about this signal, we mean that the specified properties are contained in some way in the signal, but they may be contained in any translated way. E.g., some data could be merged or split, and structured in any way. There may also be transformations to other codes, such as e.g. a modulation, or a redundant encoding to compensate for potential bit error damages, etc.

The HDR image may be encoded (e.g. as an LDR 8 bit texture image Im_1 called LDR container, plus metadata to map that the a reconstruction of the master HDR grade by at least one global tone mapping) on a memory such as a detachable memory, such as e.g. a blu-ray disk storing such a signal.

Actually, the invention embodiments can be used in many technical realizations, scenarios, or uses, such as in a video distribution system over any network technology, employing any image encoder, image decoder, method, image signal, or other product or implementation of any of the described embodiments, or any use of that video distribution system.

Many further variants of the below described embodiments are of course possible, and the skilled person understands that they may e.g. be realized in different apparatuses in different geometrical regions of the world, applying their partial functionality at different moments in time, or several times after each other, in various business usage scenarios, etc.

These and other aspects of the method and apparatus according to the invention will be apparent from and elucidated with reference to the implementations and embodiments described hereinafter, and with reference to the accompanying drawings, which serve merely as non-limiting specific illustrations exemplifying the more general concept, and in which dashes are used to indicate that a component is optional, non-dashed components not necessarily being essential. Dashes can also be used for indicating that elements, which are explained to be essential, are hidden in the interior of an object, or for intangible things such as e.g. selections of objects/regions (and how they may be shown on a display).

Figure 1B:
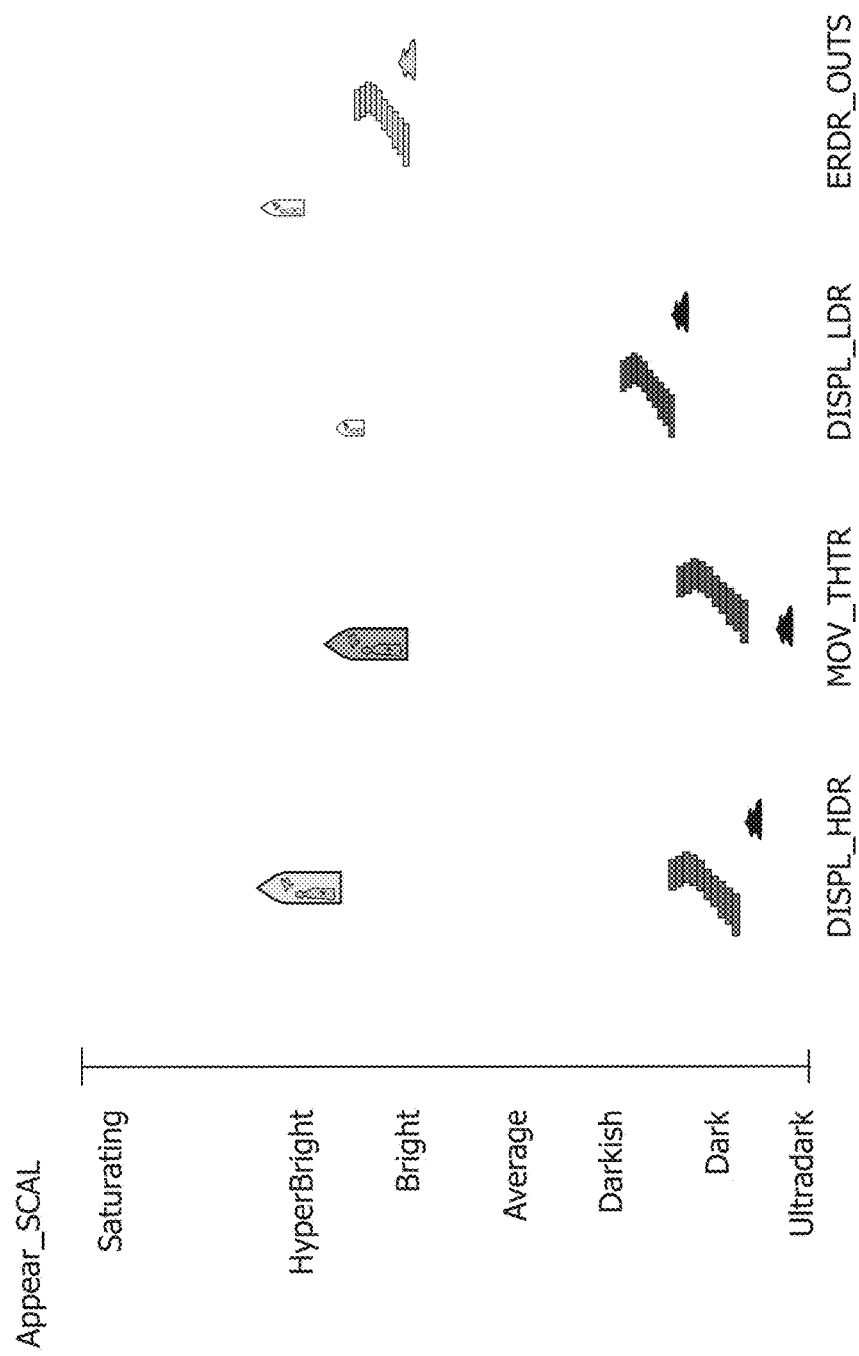
Figure 3:
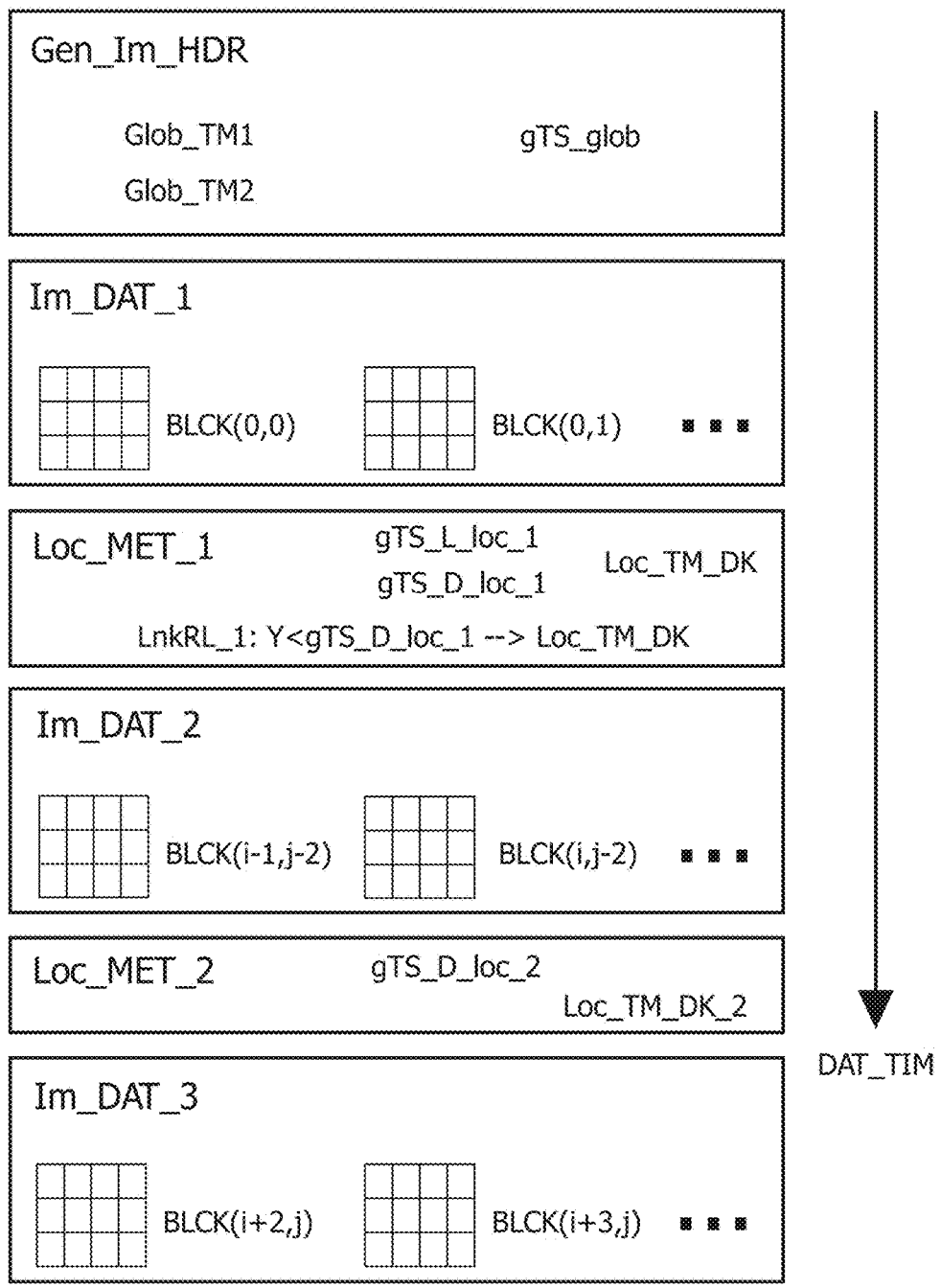
Figure 4:
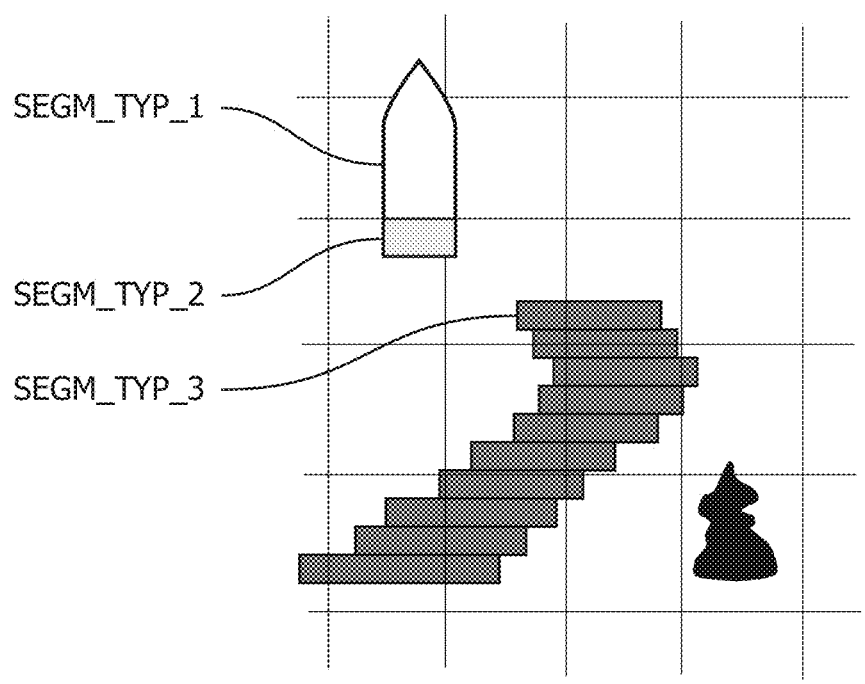
Figure 5:
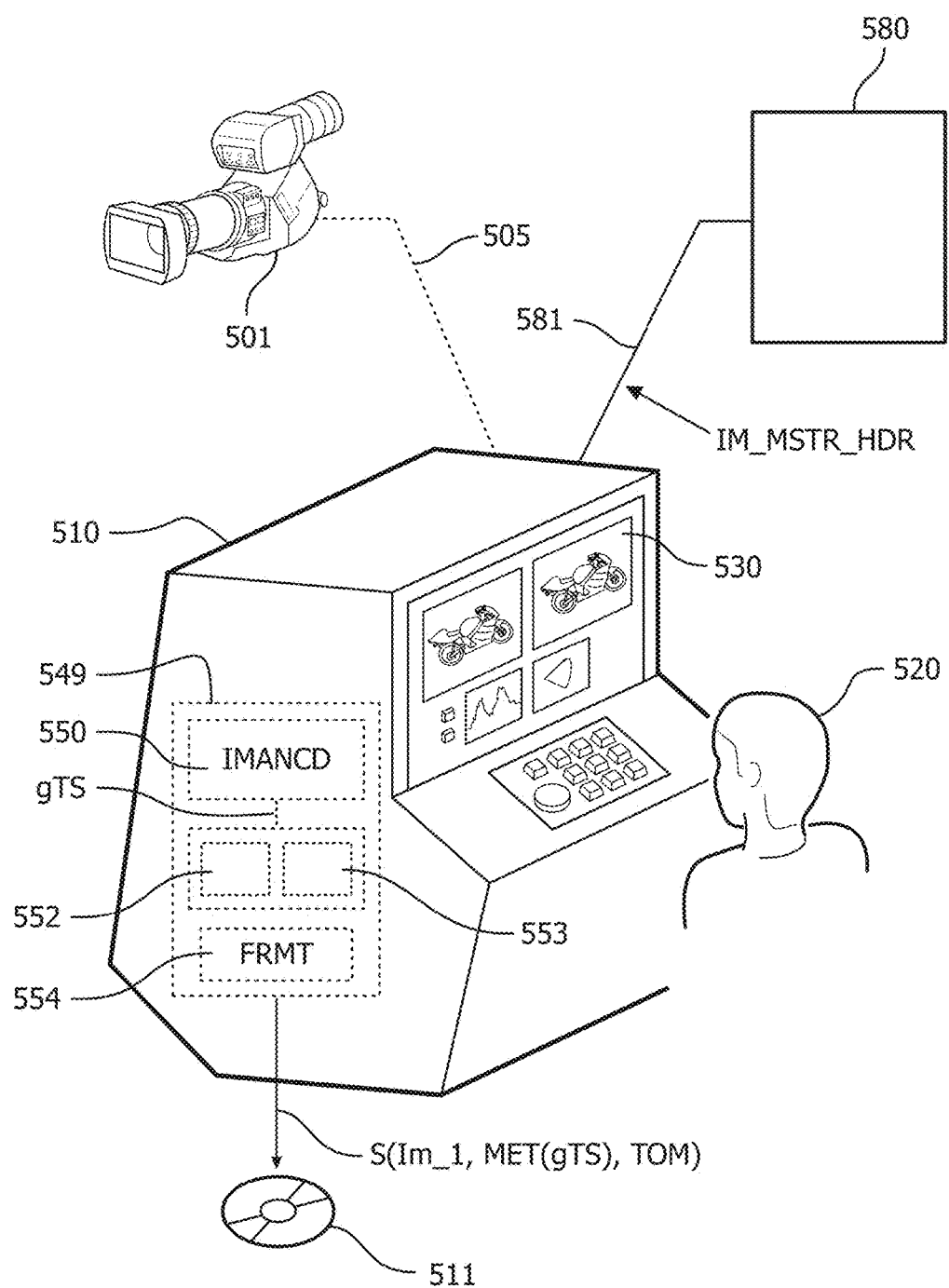
Figure 6:
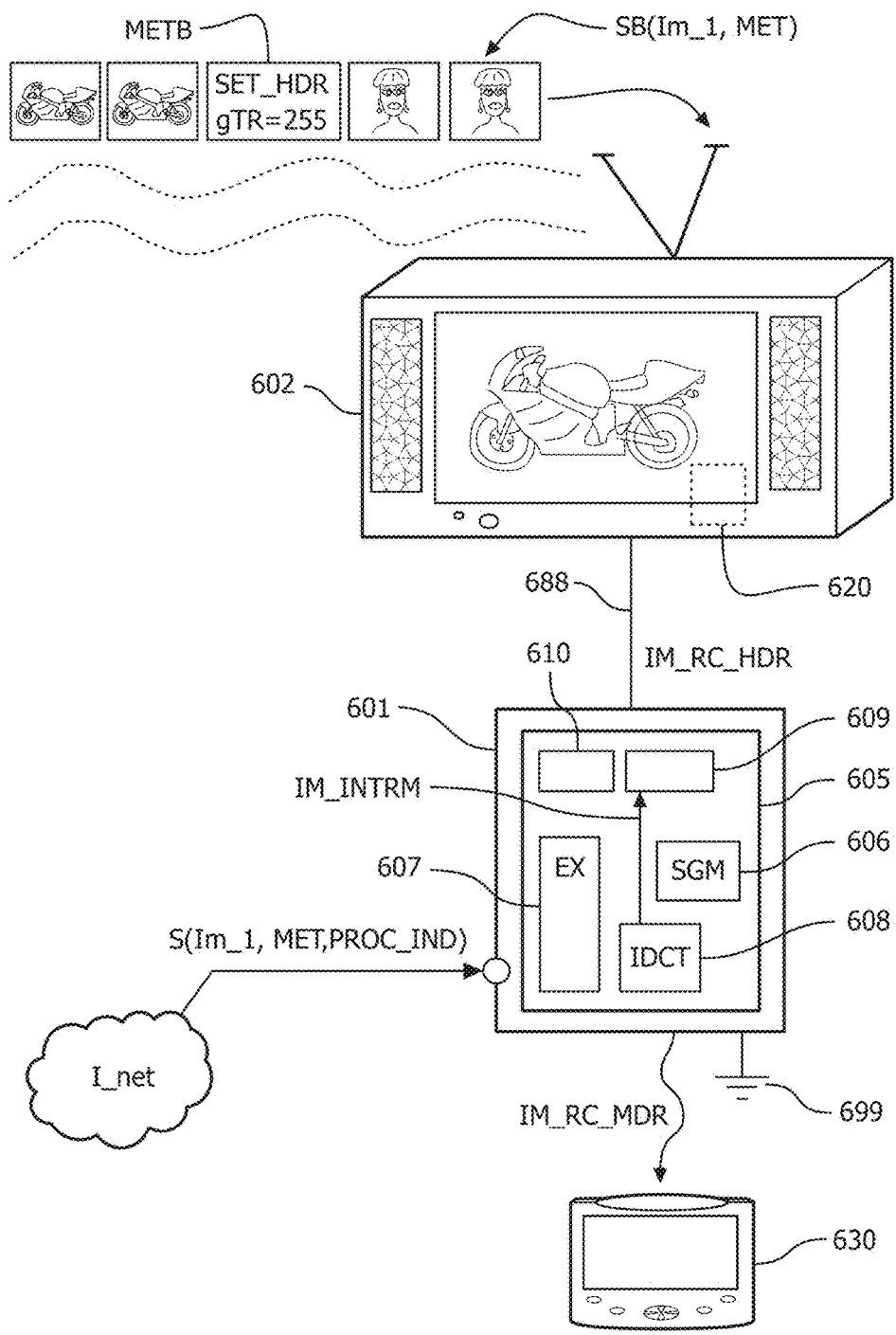
Figure 7:
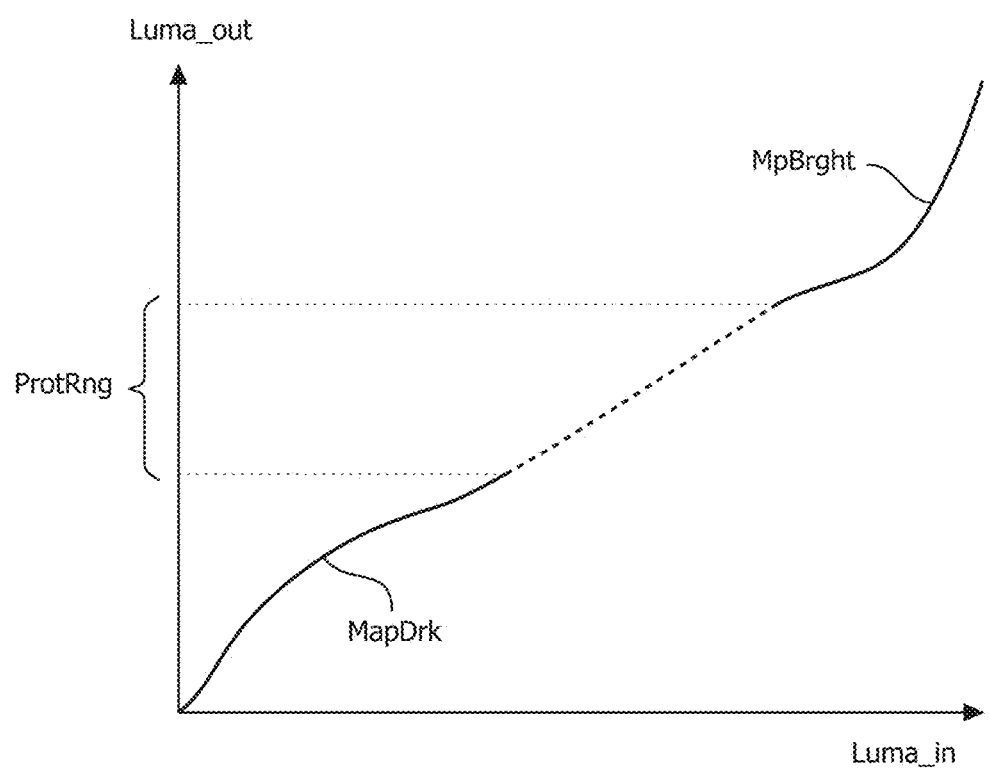
Figure 8:
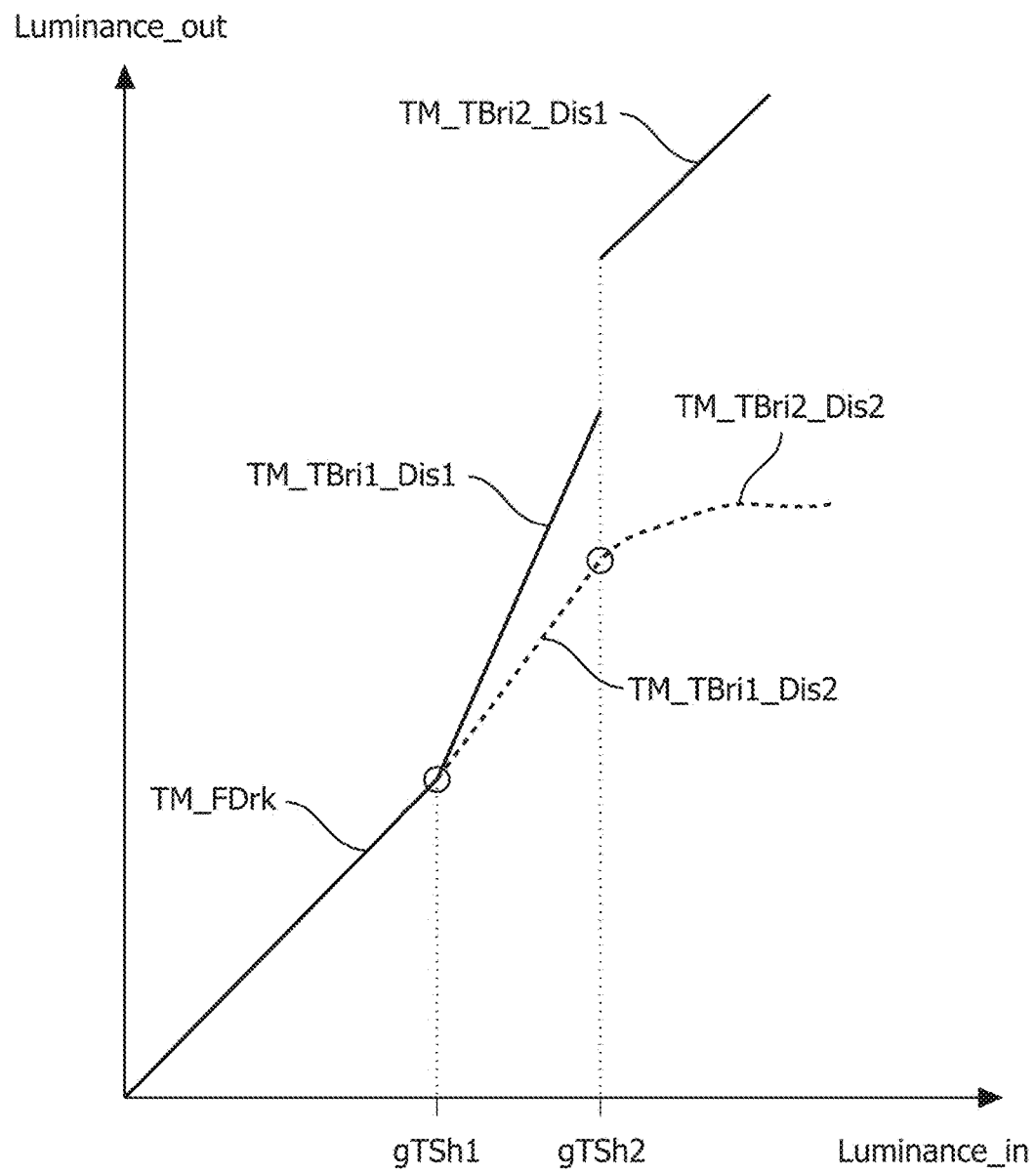

In the drawings:

FIG. 1a and FIG. 1b schematically illustrate various representations of a high dynamic range original scene, as they will be rendered in different scenarios, namely: FIG. 1a shows the absolute rendered output luminances compared to each other for a current high dynamic range display, a movie theatre displaying, a low dynamic range display and a portable display used outdoors, and FIG. 1b shows the renderings on a universal appearance axis, which absolute reference system is defined by a standard human viewer;

FIG. 2a and FIG. 2b schematically illustrate how various sub-color transformations to transform between two color representations, both defining a same image view on a scene, will be applied to at least the lumas of pixels of various objects of very different luminance (or lightness), falling in several blocks of a block decomposition of an image representation;

FIG. 3 schematically illustrates a way to encode some additional metadata according to some embodiments in a particular image signal definition, in particular how to encode region differentiator grey values before pixel color blocks to which those are applicable;

FIG. 4 schematically illustrates how a receiving side can obtain segments of very different luminance or lightness in the image based on the region differentiator grey values;

FIG. 5 schematically illustrates an encoding side system, which may be operated by a color grader, an exemplary realization of an encoder corresponding to our invention teachings;

FIG. 6 schematically illustrates a decoding side system, which may be e.g. a consumer home display system comprising such apparatuses as a main television, and a portable image viewer, and an image processing apparatus such as a central computer managing the distribution and optimal processing of all video for the different displays;

FIG. 7 schematically illustrates how designing the regions to which luminance (or luma) ranges are mapped can be well-selected to mitigate problems like compression errors; and FIG. 8 schematically illustrates how our system can be used in a scenario where pixel or object colors have to be mapped to optimal colors for a number of displays with considerably variable technical characteristics.

FIG. 1a and FIG. 1b schematically show how an original HDR scene (Orig_SCN) may be optimally represented on 4 types of display (3 typical and a hypothetical one to better illustrate the point, namely a low contrast e-reader under sunny illumination, having only a small range R_ERDR_OUTS of reproducible output luminances), and how an image coding technology should accommodate for such. We emphasize that one needs to conceptually divide the ideas regarding final rendering of a scene (i.e. the luminances to be physically outputted by a particular display) from the coding of image object lumas. That's a different technological philosophy from classical television imaging technologies like MPEG2, which have always equated these two corresponding color spaces, so that e.g. a gamma 2.2 encoded signal can be directly applied to a (standard) display, giving (approximately) the correct (studio side determined in a calibrated manner) rendered output. This is only useful if one has a closed chain, i.e. calibrated for a particular scenario, but the story breaks down if we want to have other content like in particular high dynamic range (HDR) images, and/or various displays and/or viewing environments with fundamentally different characteristics to render these signals on. Yet, one still would similarly like the simplicity of having only one (or at least few) image coding signal(s), and not different encoded images for each scenario (although they may be repackaged (e.g. transcoded, further color transformed, etc.) and transmitted via different technical channels), which would otherwise mean that a Hollywood or other grader would have to do e.g. 20 gradings rather than 1 or 2 as previously (e.g. a master movie grade and a DVD grade).

Defining HDR images or an HDR imaging technology can lead to discussions. It is of course not simply the number of bits which is the criterion, since if e.g. the maximum word length (e.g. 2^8 versus 2^10) is used for a certain white (e.g. 500 nit), then the difference is mostly or partly just one of precision (actually, displays with claimed contrast ratios of 1.000.000:1 may not even discriminatably render the lowest of these codes, and in a gamma 2.2 signal encoding such deep blacks can also not be encoded, unless the display does some impressive blackening transformation on the blacks).

The usual definition of a high dynamic range scene is the maximum luminance divided by the minimum luminance. That may well be a good definition from a hardware point of view, e.g. for a rendering display.

E.g., in the original scene, it determines what the capabilities of a camera imaging sensor should be, also if this operates with e.g. multiple exposure technology, because anything which cannot be faithfully recorded is either clipped to white or black (and there is also the rounding and noise of course). It is also a good way to indicate what a display can physically render, provided of course that is done in a fair way, including e.g. scattering on the glass front plate of display-generated light, as well as reflections from the environment (e.g. the white t-shirt of the viewer in front of the tv). All kinds of light scattering and reflections are the reasons why actual captured or viewed dynamic range is often lower than the marketing numbers quoted, whether it is because light leaks through all kinds of paths from lighter spots of the scene to darker ones (during illumination of the scene, unless one carefully constructs it and manages the shadow areas), spurious paths in cameras (e.g. lens haze, or body reflections), or viewing environment issues (e.g. display or surround light scattering in the front plate of the display, or reflections within the display entering the light homogenizer, etc.) up to the viewer's own eye (however, although the viewer may start losing dark discrimination precision when having strong light sources in his visual field, especially when nearby the dark regions, we could ignore this factor as a display may ideally need to be better than the viewer, and at least an image encoding should be better, as we don't know in advance how the receiving side will process it and influence visibility of the image's regions). Hence with such a contrast ratio definition one should as the minimum level use what in fact ultimately is still discriminable in the eye (given noise etc.), and not e.g. the theoretical value that an off LED gives (near) zero output luminance (therefore standards impose e.g. checker-board patterns to measure fairer contrast ratios), as there is never a situation of zero light.

A luminance ratio is however not such a good dynamic range criterion for the CODING of HDR images. What has to be coded is not so much an issue of what is renderable, but rather what is in a scene and what can at least theoretically be perceived, i.e. the image signal needs to contain exactly or approximately that data needed to be able to recreate the desired appearance, and in all display environments expectable to be rendering the image, even perhaps on the better displays in a faraway future (directly shining into the eye e.g.).

E.g. just specifying a contrast ratio doesn't account for the fact that in a dark environment like a movie theatre the visual system needs more contrast to see the same scene appearing in the image (whereas a pure multiplicative scaling on the minimum and maximum would yield the same contrast ratio). Contrasts are also in fact local phenomena, since a relatively light object can be made to be perceived as much darker if surrounded by lighter objects (spatial contrast). In fact, psychologically the viewer starts analyzing the picture, and identifies colors which he thinks are black, white, above-white, etc. And the viewer can consider something to be black or white, until he perceives an even darker black or brighter white. So how "dynamic" a picture looks is not only a function of the "black" and the "white" in the scene, but also function of other more local contrast measures which can be defined on the basis of allocation of grey values (e.g. one may create a different look by increasing the luminance distance of different grays in textures—making rocky textures more harsh e.g.-, or make shadows darker, or even play on the interrelationships between sharpness and contrast). One may hence imagine that if one wants to give a face a different look (more smooth, more contrasty, more wrinkled, etc.), that the codes defining the facial textures have to allow such an operation, i.e. e.g. if one were to have only two grey values defining the facial texture, changing facial contrast would be a very difficult operation. Such spottiness of facial colors may be one problem of several current image encoding technologies.

To put the problem even more clearly, showing an example that from a coding point of view dynamic range is not just about the darkest black and the brightest white, but about what exactly is in the imaged scene, a black and white drawing (i.e. only having two different gray values) may be RENDERED on an HDR display with 5000 nit white and 0.5 nit black (i.e. with a high luminance dynamic range), but would we really call this an HDR image? We can even pose further questions, like whether we would want to display such a simple signal with the maximum white (peak white) respectively black characteristics of the display anyway. Wouldn't that be unnatural, or at least unnecessary, let alone whether one would need to directly encode those values like that (e.g. with code 0 and 10000 and not just as e.g. 0 and 2). In fact, e.g. when grading whiter areas in general one appearance artifact that can start happening is that the textured white region starts to look chalky (as if drawn by using chalk) which is unlike the actual physical texture the region should have. We would come to the question: what is "black" and "white" again. Indeed, under a sunny illumination, assuming our example would be a black-and-white drawing e.g., white may have a real scene luminance of 5000 nit, but under different illumination it could just as well be 50 nit. And unless one were to severely shield the black regions from the scene illumination, they would normally be somewhere around 1% of the white, and not $1/10000^{th}$. So, ignoring that more contrasty rendered images may to some degree have a preferred look, we would probably like to show that black and white picture with e.g. high brightness yet approximately 100:1 luminance range on the high luminance subrange of a HDR display to create that sun-illuminated drawing appearance. Otherwise anyway we risk even if the rendered picture doesn't look strange that the eye discounts for some of the difference in rendering luminance, so with a grader we would always like to optimally use the available display dynamic range given what is present as content in the image, and in view of temporal effects even previous and successive images. Also note that although misty images are conventionally considered as low dynamic range, such an image with also bright lights in it would at least need to be mapped to a high subregion of a luminance axis of display renderable colors.

Our coding philosophy is that an encoding needs to take both these factors into account, namely on the one hand how dynamic an image will typically ultimately be rendered, but on the other hand what kinds of more or less bright objects the imaged scene contained. So, it would for our purposes (i.a. image representation or coding) be more accurate to say that an HDR image is an image which contains: a sufficient amount of grey values along a number of ranges sufficiently far away along a lightness appearance axis (lightness being a psychophysical quantity not to be confused with luminance, or coded luma). Hence we can better explain the physics and required technical realizations of HDR images with the concept of "nested appearance ranges", as elucidated with FIG. 1.

In FIG. 1a and FIG. 2b and we see a scene (Orig_SCN) to be captured having simultaneously many dark and bright luminances, i.e. significant texture details over a luminance range in both dark and brightly lit areas. For the bright region/object (BR_obj) there is a stained glass window, which has many nice colors which should be accurately encoded and rendered. In the dark interior of the building, there is a dark wooden staircase (DRK_obj), and an even darker object (VDRK_obj). I.e., a human standing in that original scene would see many bright luminances (and in fact colors) in the stained glass window, and many different dark luminances in the different shadow regions on the stairs. When turning his head, his retinal and brain processing will adapt to the looking at the stained glass window, or vice versa trying to discriminate dark looking objects in the darker regions. How dark everything looks depends of course on how well the scene constructors isolated the darker regions from the brighter ones, but one can e.g. imagine the example of trying to look through a small sewer hole on the pavement on a very sunny day. I.e. the "darker" regions may vary from looking dark grey to indiscriminable and ultimate black (or during the night indiscriminable more grayish black). On the rendering display, we would like to create, given capabilities, at least a somewhat similar experience (e.g. indiscriminable darkish colors, with a luminance low enough that they at least look reasonably blackish), i.e. balancing both the fact that a significant number of output luminances per luminance subrange still render the object textures of all objects both bright and dark with good visible quality, versus that the stained glass window should appear significantly brighter than average (given the particular dynamic range of the display this may be more of a simulation using psychovisual "illusional" effect versus an actual photometric large difference for high brightness displays), and the staircase darker than average (average being e.g. the 18% grey level of the illuminated room surround). Irrespective of how the display will optimally do this, the image encoding should at least contain all the information, and preferably in an easily manageable way.

One may now capture and encode this scene, with a single data signal (e.g. 0-1023, with a fixed gamma function for mapping input or output luminances to codes; i.e. e.g. if the gamma function defines output luminances, one may first convert the captured image to a reference N-nit e.g. 16 bit display (linear or otherwise, e.g. with 4000 nit peak brightness), and then encode those "new scene values" to a e.g. 10 bit representation, with the intention that on the reference display exact reproduction would occur, and a e.g. 2000 nit display would approximate the look). Or one may optimize various encoded signals for different scenarios, e.g. applying a different gamma function for a movie theatre signal, to compensate for the dark environment behavior of the human visual system. But ideally the main processing—which can be very complex in view of the highly local and nonlinear behavior of human vision-should already be largely present in the encoded one or more graded images (in simple HDR image encodings the LDR grading being encoded simultaneously inside the HDR master grading, by using the LDR container concept, i.e. by which principle one can re-obtain the master HDR image from that LDR encoded grading (e.g. a classically encoded MPEG-AVC image), by inverting the color mapping strategy used to make it from the master HDR grading, by using co-encoded metadata encoding that mapping; but of course the image encoding may contain several gradings, whether with several mapping functions or at least partial further pixel images), i.e. the look is already approximately correctly determined for a number of typical display scenarios. In that case the actual display optimization will with a relatively simple operation create the approximately right final look, e.g. a final simple gamma function to increase contrast for darker surround viewing etc.

In any case, final appearance will look as shown in FIG. 1b, and the photometrically measurable output luminances will be like in FIG. 1a. The first scenario is the signal being shown on an HDR display (as said, either with its own optimized HDR grade with at most minimal processing (e.g. some really hardware specifics like mimicking CRT-like behavior with an additional compensation for the LCD valve physics) directly usable for driving the HDR display, or a driving signal derived from a single encoded HDR image/video signal). This display is capable of a peak brightness (white) of 5000 nit, and a minimal output luminance of 0.5 nit. Note that the lower value is an average approximation, as it will critically vary with several surround parameters. Even in a controlled environment, theater security lights may leak light to the screen, and so does the unpredictable factor of people switching on their mobile phones (although in general the effect will be limited, but especially in the darkest luminances, it may affect the rendering). In a normal home, lighting situations may be very variable.

But still the question is how a human will perceive such luminances, as this will depend on the state of his visual system, inter alia determined by room illumination, whether he can at times see through a window outside, etc. A viewer may control this aspect by changing picture settings on his remote control. In any case, the HDR display has a relatively large subrange of bright values available for rendering the stained glass window (i.e. it is shown relatively large, covering an upper part of the range R_D_HDR). At the same time, the staircase can be shown sufficiently dark, i.e. well below 50 nit. It is assumed for our example that this has as a psychovisual impact that these stairs look both darker compared to the visual estimation of the average lightness (e.g. 18% gray), but also that still significantly easily the texture details can be seen over the surround illumination reflections of the front glass of the display (e.g. a scenario in which the viewer has dimmed his surround lighting to a movie viewing level, and the average gray is mostly determined by the television and its image content itself). This HDR display (+viewing environment) is so good that it can even show the very dark object with still darker display output luminance and corresponding psychovisual lightness.

If we now show the same signal on a digital cinema projector in a movie theatre (again, whether optimally gamma corrected or not), we now that this theatre rendering will show no whites above approximately 50 nit, yet, being a dark environment, at least darker shots may show luminances down to say 0.05 nit, i.e. much darker than the home room HDR display rendering. I.e. the cinema output luminance range R_CIN falls between 0.05 and 50 nit. We cannot say that the stained glass window, which will be allocated a smaller subrange of higher luminances in R_CIN, will look equally dark as the stairs on the HDR display which have approximately identical output luminances, since the viewer has adapted to the dark cinema room, hence sees lower output luminances as (near)white. I.e., also in the movie theater we can have a relatively large dynamic range, at least inter-picture (and at least it may be encoded if not on the positive film or digital signal, then on the master negative). Especially with some of the psychovisual simulation, like e.g. playing on culturally established dayish or nightish colors, also cinema viewer still has the solution that after a dark basement scene someone steps into the sun (be it less impressive than on the HDR display).

The fact that the human visual system adapts can be better seen in the psychological appearance representation of FIG. 1b, where we have put the various rendered output images on a lightness appearance axis (Appear_SCAL). This is in fact what the brain sees (with all its complex processing), but approximately we may map it to how retinal cones behave (or at least together with ganglion cell connections). Anyway, in our technical philosophy that complexity can be handled by the human grader, as it always should as the content creator likes to be in charge of the look of his content. We see indeed that the rendering on the HDR home room display (DISPL_HDR) and the movie theatre rendering (MOV_THTR) are reasonably similar (at least relatively darkish environments can be simulated, as well as bright exteriors). However, the movie theatre rendering is not capable of showing such very bright regions, at least accurately without any color deformations (which is shown by the somewhat darker pictogram of the stained glass window, moving from the hyperbright to the bright region of the appearance axis). We'd like to emphasize that this effect is also due to the separate rendering in a movie theatre versus on a HDR display at home, since if one simultaneously renders on a HDR display in a movie theatre, the comparison becomes different again (since now the bright regions on the relatively dim projection screen can be directly compared to those on the HDR display). However, being in relatively deep darkness, the theater rendering can simulate very dark scenes, like e.g. a night scene, in which slowly the sun starts rising towards the horizon. Sitting in a bright sun-lit living room one can never have this appearance. Any environment having also bright regions (e.g. a co-placed brightly shining HDR display) will to lesser or greater extent destroy that visual "illusion" of a fully dark night scene. Even ignoring that the rendered dark colors on the display would fall below the front glass reflection luminance, all the light colors coming in the eye at large angles from the environment would break the illusion (that is even better illustrated with the e-reader example). Of course in principle one could make one's living room even much darker than in the movie theatre since at home safety is not an issue, which would mean that then the HDR display also has higher capabilities for deeper black, but usually people at home like to have some level of cosy surround illumination (in any case, an encoded image catering for all rendering situations could also easily be optimized by those people that do like to see their horror movies in the scariest way in a pitch black living room, which would mean the darkest regions of the image need to be both encoded with sufficient precision and easily accessible for the colorimetric optimization processing). Note also that in very dark environments, the scene contrast as seen by the human visual system may severely degrade (i.e as one would see the original scene), so one may need to simulate those (in e.g. a movie theater were that effect is not yet so strong) by rendering the darkest objects with a dark grey a couple of stops above pitch black, and the white objects with a light grey a couple of stops below the white reference zone lightness.

So there are regions which may not be accurately renderable on each possible display, yet we would still like to encode them, since there may or will be displays which are capable of rendering them (be it e.g. after a brightening), this example giving a ultradark region for the cinema, and a hyperbright region for some HDR displays. Note that the ultradark region of the human visual system may end somewhere on the low side with a high level of human visual adaptation, such as e.g. for encoding a very dimly lit cave where some light leaks through a crack in the distance. However, such a level is irrelevant for display even in the (theoretical) darkest movie theaters, because the brighter parts of the image/video content will not allow the visual system to optimally adapt (no one watches movies of caves in a cave). It may be equated however with the level where the eye starts seeing noisily and blurredly, such as e.g. when one enters a dark room after having been in the sun. Such a visual experience is something which one may want to render, because it conveys a new level of visual quality, just like dazzling lights on the bright side. I.e. it is the regime where one balances what (just) can be seen with what can't be seen. But the point is that a dark environment rendering can better show the very dark object, since it may render it below the dark region of the appearance axis, there were the ultradark region starts.

A third display is an LDR home display (DISPL_LDR rendering), e.g. a "classical" television with say a contemporary peak brightness of 300 nit (which we will assume for our discussion behaves relatively similar to older displays of e.g. 100 nit peak brightness). Assume it can show somewhat lesser deep blacks (of course in the blacks it could be similar to the HDR display, but for the sake of explanation let's say it has e.g. global dimming instead of 2D LED dimming). Also it may render less dark colors because perhaps in view of the lower peak brightness it needs to reserve a larger subrange of its LDR range R_D_LDR for brighter and intermediate luminances, so it will render both the staircase and the very dark object with at least visually approximately the same dark grays. Actually, it will reserve only few luminance levels for the staircase, making it less detailedly textured, and the very dark object will typically be clipped to black (and may be even alas invisible against the clipped to black parts of the staircase). Another typical property of the LDR display is that it cannot faithfully render the hyperbright objects, and will typically (soft)clip them to a very small range of (near)whites, all such depending inter alia on what contrast one wants for the middle ranges near midgrey. Clipping and approximation strategies may have a strong psychovisual impact, as the brain recognizes something special is going on.

So we see that the rendering is actually an allocation of (human visual adaptation-adjusted) luminances (i.e. in fact corresponding lightnesses and brightnesses for the human visual system) of the scene to different subranges of the respective display-renderable luminance range. Some displays can only render a subpart of the total range which is nested (from at least one side) in the total range, and some displays can render nearly all appearances relatively faithfully. I.e. when mapping to output luminances or in fact display driving image values (i.e. for driving e.g. the LCD valves and some backlight driving), one must make some approximation, slightly changing the exact appearance of a scene object or region, into an appearance which is still reasonably similar, and if not convincing at least acceptable. The e-reader example in outside sunlight was chosen to emphasize the point of distortion. Here one must force the large range of scene luminances almost onto a single renderable luminance value (its luminance range E_ERDR_OUTS being very small), and one must shift regions of the image over considerable distances of the appearance axis (in any case as most of the blacks will be overshined by the sunny reflections, at least the appearance range will be small, and the display may as well compensate for that by just using physical driving values in a corresponding small output luminance range). This has e.g. as a consequence that dark regions can totally not be rendered, and one must make severely distorted choices. Instead of showing e.g. 10% black if 50% is the lowest visible value, one could just as well render all those values near 50%, or even better, with a tone mapping to values above that. E.g., one may clip the entire darker region to what this display has as its "black" (i.e. its lowest renderable value), which with such a small luminance range may not even look black, because the alternative of spreading the dark object luminances over brighter luminances is not an option, since they may then become lighter than some of the stained glass window pixels. Similarly one must abandon the desire that some scenes can be faithfully rendered in a print. One can only do ones best to use mapping and psychovisual principles to at least have a nice equivalent (but no shining windows unless one incorporates fluorescent inks or similar and strongly illuminates with an UV source). Note that for simplicity we just discussed the principles on a simplified one-dimensional lightness axis. The three-dimensional nature of the actual gamuts (i.e. mainly those of the rendering devices) also has an interesting impact on the chromatic processing of colors, e.g. their saturation, which visually even may partially be confused/balanced with brightness in some situations.

Note that for completeness we have also shown saturating appearances, since they occur in natural scenes e.g. when looking into lamps, or e.g. near the sun. This is when the cone-opsin levels get for a short time get severely distorted (bleaching), and you see spots. E.g. in a winter scene you may be looking at a low sun, and the air around it may be very bright, and sunlight reflecting on particles of the clouds around the sun may be even brighter. It is of course not desirable to render these regions on any HDR display with visual pigment saturating bright colors, but one may allocate two different luminance subranges in the hyperbright region, i.e. e.g. show those regions at least a little irritatingly bright. On the other hand, one may also consider that these colors are not that important anymore anyway (who cares about the actual brightness or color of an incandescent lamp filament anyway, although the coding of brightly lit colored houses, or even some specular reflections, or colored TL tube commercial signs etc. may be important still anyway) and encoding them with a value similar to clipping, which one can just call hyperbright, or a region near the maximum codes (e.g. just the value 1023). The display can then choose whether it wants to render those irritatingly bright, or with a little lesser output luminance, in which case the brain may estimate the brightness from the clipping. It also allows the content creator to focus on what he needs encoded accurately, and which when used nearly directly for driving a e.g. HDR display will yield good quality (e.g. contrast) for all those regions (e.g. both darker indoors and an even darker room, and sunny outdoors), and which very bright regions he considers less relevant and may always be clipped (potentially with a below peak brightness output luminance e.g. in a power saving mode), even on HDR displays. Such power saving modes can be better realized by the display if the grader defines a number of such "irrelevantly bright" regions, typically with several gTS values, which the power saver may use to distort the image above all such values for a number of increased power saving modes. In fact the creator may even artistically use the one or more "saturating" codes to drop important content from the scene as imaged e.g. to realize a highly saturating look.

Now one may want to transform representations of a scene in a first colorimetry—in particular a color space defining the scene objects with first coordinates along a luma or luminance or similar grey value related axis (assuming for simplicity the two chromatic color coordinates are fixed in both representations, e.g. a hue and a saturation) according to a first allocation rule (defining a local scene object patch luminance encoded as a pixel luma; and although instead of lumas we could encode the pixels also e.g. with luminances in an XYZ system, we will for simplicity call the coded grey values lumas)—to a second colorimetry. As just one example for easily describing below some concepts and embodiments of the invention, we will assume that we have an original scene with a luminance ratio of e.g. 2097152:1, or 21 bits if linearly encoded. Of course this may still be supplemented with an exact luminance value of the brightest spot the 2^21 value corresponds with (which may be different for a sunny outdoors scene than for a dark evening indoors scene). In practice, since no display can encode the sun anyway, we will further for simplicity assume that we can relatively faithfully (i.e. with psychovisually less important distortions, like lowering the luminance of the sun in its display rendered version) encode these original HDR scenes with a 16 bit master HDR encoding (at least for luma Y, and we don't care for now whether that's float or int). That is because one may define that coding to be non-linear along its luma axis, i.e. by using a master gamma to map scene object luminances to HDR color space codes.

Another example is to encode, i.e. map that 16 bit encoding into a new colorimetry/color space, namely an 8 bit code, e.g. with the standard 2.2 gamma. Several gamut mappings exist for that, e.g. one might just linearly compress the luma range, but since that gives bad results, one usually uses a more gradual e.g. sigmoidal curve, and one may use more complex models, like e.g. applying the compression to a low-pass filtered version of the image, and then adding more strongly the high pass detail to that. Or the mapping may model how the human visual system approximately (there being of course the above described impossibilities to do some kinds of renderings on limited hardware) would see the original scene, if seen in the new framework of e.g. a display with much lower dynamic range, i.e. an LDR display. The human visual system behaves non-linearly, diminishing the less important visual aspects, and e.g. a harsh shadow in the original scene (at least how some cameras see it) may be seen as relatively light grayish. One should not make the mistake of mapping it to an LDR gamut so that much of the shadow comes near the minimum black of that display, because then of course the visual system will interpret it as too dark. One should soften it somewhat by lowering (local) contrast, so that it will look less deep, as in the original scene. In general, the gamut mapping to the LDR gamut may use all kinds of mathematics applying local optimization, etc.

So in conclusion, a transformation function is applied to the pixels of the 16 bit representation, to obtain the 8 bit representation. E.g. first a global transformation, and then some spatially local further transformations. And vice versa, one may transform (e.g. predict) a HDR (so e.g. our 16 bit representation) representation from an 8 bit encoding, by another color/luma mapping. An example of such a system was published in WO2012004709 (generation of high dynamic range images from low dynamic range images).

Let's again simplify the explanation by focusing on the mapping from an 8-bit LDR encoding, to a 16 bit HDR representation, usable for driving an HDR display of say 5000 nit peak white, and thereby giving an artistically pleasing (i.e. good quality) rendering of the original scene (e.g. it looks reasonably similar, in that the shadows still look menacingly dark etc.; n.b. if the original 16 bit master encoding was an optimally tuned grading by a computer artist according to the directions of the director and/or DOP, e.g. making the shadow region even more murky or menacingly dark, then the quality intention may be to have the ultimately rendering HDR display convey that menacing look as good as possible, i.e. as intended).

There can be different ways to map the pixels from their 8-bit code value, to pixels (for the same spatial position) with a new, different 16-bit code value. E.g. this mapping may boost the rendered brightness of the stained glass window, since the HDR display is capable of rendering such bright regions, which will correspond with a corresponding transformation to obtain the pixel luma of the HDR image (suppose for simplicity this directly drives the HDR display), based on how the HDR display behaves and the HDR code is defined. Note that when we describe the brightness behavior of the imaged objects and talk about e.g. boosting we will for simplicity compare output luminances (e.g. rendered luminance on the LDR display=400 out of 500, vs. 3000 on the HDR display), where in an actual encoded luma space the same may be realized e.g. rather by dimming the darker regions (giving relatively the same result), and keeping the stained glass windows high both for the HDR and LDR encoding.

A transformation may be global, i.e. wherever the pixel is situated in the image, the functional form of the transformation is only dependent on the LDR/8-bit image pixel value, i.e.: $Y\_16b=f(Y\_8b)$, in which $Y\_16b$ is the 16 bit luma, which may be e.g. represented as a binary code word, or a float value between 0 and 1, etc., and similarly for the 8 bit luma $Y\_8b$. An example of such a function is a global gamma: $Y\_16b=g*Y\_8b^{gamma}$, in which g is a gain factor, and gamma the coefficient of a power function.

The advantage of such a global function is that one needs to encode only a small amount of data, e.g. one may transmit the gamma and gain before each picture, or even a shot of pictures of the same scene, having the same image characteristics.

The disadvantage is that, if one uses it to go from HDR/16 to LDR/8 bits (i.e. a signal that is supposed to look good on an LDR display of say 200 nit peak white), although it approximately makes the look correct (a dominant behavior of linearly compressing a HDR picture with high bright regions, is that one compresses the darker parts too much, making the picture on average look to dark on LDR displays, but a gamma function can already balancedly handle approximately two regions, a darker versus a brighter one), because one corrects for the compression in the darker parts of the picture by doing that less with the appropriate gamma shape. But it is only a single, simple functional shape. When critically tuning some colors in a background, similar colors in a foreground object may so change in a way which is for that object less desirable. Also when moving from 8 to 16 bits, one may e.g. put the bright lights at the right HDR display output luminance position (i.e. the right Y_16b), but by doing that by tuning/stretching the gamma function, one may e.g. make the darker regions brighter than desired. Or one may use a more complex mapping function like a spline with optimally selected control points, but one still risks to shift some of the intermediate greys to undesirable lumas, not to speak about this perhaps not being the easiest way to control the color look of the image.

The problem is aggravated because one may have done e.g. a lossy mapping of the original HDR scene to the 8 bit LDR image, which may happen e.g. for the dark staircase and the very dark object. Although originally in the to be captured scene that very dark object was much darker than the staircase, in the 8 bit image it may have luma values which correspond to values of at least some of the staircase pixels. I.e. pixels which should have (very) different luma values now have the same values (or at least the histograms of sets of pixels may overlap where they shouldn't), although the good news is that they may reside in different spatial regions of the image. A single function operating on the encoded grey values can no longer discriminate these two cases. I.e. if one wants to transform the very dark object to Y-16b lumas which are very low, the same will erroneously happen with some of the staircase stairs (resulting e.g. in an excessively contrasty darkening of some parts of the stairs), or vice versa. I.e. the artist or color transformation apparatus will want to be able to apply a different transformation to those two objects.

The other class of transformations are local luma (or in general color) transformations, which apply a different function to each pixel. One could e.g. look at a mask area around the pixel, and boost its luma a little bit depending on what the surrounding values are, e.g. if they are almost the same yet somewhat different. An example of this is peaking around object edges, where one wants to boost the local pixel lumas somewhat above vs. below the step profile value in the vicinity of the edge. An example in transformation/coding of HDR images is the JPEG-HDR principle, in which one uses a normal JPEG image for the texture, and then co-encodes a boost image which has a boost factor for each pixel. The advantage is that one could co-encode whatever algorithmic local transformation desire as realized as a final result in such an image (e.g. increasing the texture contrast in a first way, and a semiglobal illumination gradient in another, which the grading artist could optimize to his desire), yet that comes at a severe price of an increased amount of to be encoded data, since now for each HDR image two LDR images have to be encoded (versus our single e.g. LDR container image mentioned above). One could even ask oneself if one encodes 8 bit_texture*8 bit_boost, whether it is not better to just rawly encode 16 bit_HDR.

Now there is a middle way, because if a certain boost is desirable, it will usually be desirable for an entire object, e.g. the stained glass window. I.e., the pixel luma/boost values in the boost image will not be totally spatially decorrelated, even more so, if one processes/encodes smartly, they may be so correlated one can much more simplifiedly represent them. I.e. one may parametrically specify them in a functional way, perhaps even so simple as with a single boost number which can be stored in co-encoded metadata.

That would require encoding objects, or more generically geometric image regions.

One easy example of this segmentation into pieces is to define a grid of blocks, and then define an optimal transform for each rectangular sub-area. E.g. one could define a gain multiplier and offset for each and every one of those blocks as in EP2009921 [Liu Shan et al. Mitsubishi Electric: Method for inverse tone mapping], or co-encode a local gamma for each different block. Such methods usually quickly suffer from block artefacts. E.g., one may come to a different optimal gain or gamma to be applied to block BLCK(i+1 j−1) (see FIG. 2a) and perhaps for blocks beyond that like up to BLCK(i+1, j) than for block BLCK(i+2,j). That is because for the former block one may optimize the transformation by highly valueing an optimal look of the staircase, whereas for the latter block one may optimize e.g. by focusing on a visibility criterion of the very dark object. Even small deviations in a part of the curve (i.e. for some available pixel lumas Y_8b) may result in a visibility of a difference of the statistics of the lumas Y_16b of the background parts/objects in these two blocks, i.e. resulting in the perception of a visual boundary, as the brain is trained to pick up on such statistical differences, for that may mean detecting a tiger hiding in the yellowish grass. When applying some algorithms, one may see a coarse grid, which visibility is increased by temporal modulations of the underlying regions' color statistics after transformation to Y_16b.

Now there is also a possible solution to that problem, namely one could encode accurately all objects, and hence guarantee that all pixels of the dark foreground object get their optimal local transform, and the background region pixels of all blocks in that region get the same transformation given them the optimal rendering, and hence without visual block edges.

But all hopes of doing that would evaporate in view of the coding efficiency i.e. the amount of bits needed again, driving us towards the obligation to accept the two image encoding, or probably even the raw Y_16b encoding (be it perhaps that then for backwards compatibility another Y_8b encoding would be needed additionally). Furthermore, not only does precisely encoding the actual boundary of e.g. our stairs involve a lot of to be encoded data for e.g. a spline function, but also graders oftentimes like to make their object selections less precise, especially when needing to do 100s or 1000 s of shots in a movie.

In the past such object-oriented encodings have been attempted in the MPEG4-2 framework, but they have never been successful for several reasons. One cannot just extract these objects, since one doesn't know what their spatially varying texture pattern definitions are, so one is led to encoding their boundaries. But that one the one hand leads to complex encoding structures (compared to the universal simplicity of block-based encoding technology), such as e.g. splines or snakes, and secondly probably the need of human intervention to optimally position these snakes (since boundary misalignment is a plague of many algorithms, e.g. missing a corner piece of an object), and thirdly a lot off additional code values to encode those boundary curves. All these complicating factors don't seem to favor easy adoption in practical video or still picture encoding standards.

But the inventor realized that in the particular HDR encoding situation (i.e. when transforming between a first, e.g. lower dynamic and second, e.g. higher dynamic luma range representation of a scene) there is almost always a particular property of the image which does allow a encoding with all the advantages of accurate segmentation, yet with the advantage of needing only a few bits of additional data too. In all the renderings (or underlying image codings) of FIG. 1, there is always a hierarchy of region brightnesses (spanning different luminance or luma ranges), e.g. the window is always going to be the brightest object. And although spatially there may be darker objects on the left, brighter objects in the middle and again darker objects on the right, typically in each local region there is always some part of the picture which is darker, and some part which is brighter (actually there may be several classes, like also middle dark objects, but at least some pixels are the brightest and some are the darkest, and usually they even have relatively simple geometric structures like the convex solid filled structure of the glass window). But note that even if we have a pattern of jail bars against a bright sky in a block that is not a problem, since all jail bars are easily discriminated within the block as having the darker pixels. Also the distribution over several blocks is normally easily manageable, even if it entails resetting some gTS values at some times between blocks along a scan path. For an odd case which incidentally would happen to be more difficult, one can of course take recourse to auxiliary methods or strategies.

The principle is explained with FIG. 2a and FIG. 2b.

In FIG. 2a we have now shown our image with stained glass illumination of the dark wooden staircase with its block subdivision superimposed. It is in these blocks that e.g. an automatic image analysis algorithm would analyze the local image statistics, such as e.g. the local luma histogram (or derived therefrom luminance histogram, e.g. of a scene representation in a reference colorimetry, of display rendering), and come to a proposition to create a Y_16b HDR image by transforming a Y_8b LDR image. E.g. it may use statistical principles and knowledge about how a typical image would look (if the stairs are relatively dark already, a particular first mapping may typically make it too dark on an LDR display, or the grader may just test such a scenario by checking it), and then select a mapping gamma of e.g. 4.3. An example of such a desirable transformation is shown in FIG. 2b. As said above, there need not be a full transformation function or algorithm (instead of a gamma function, one could have a set of programmed rules, like e.g. calculate a local texture measure, local at a local variation of luma, etc., to come to a final luma value for one or more local pixels) per pixel, but we desire semi-global optimized transformation, i.e. a transformation per object or class typically. In the image region covered by block BLCK(i−1,j−4) we see a local sub-scene in the area selected with that block comprised of two objects, namely a part of the stained glass window, and the wall around it (which could e.g. have bricks or wallpaper the texture of which may also have to be rendered with good quality, but for simplicity that is not drawn), which occupies those pixels of the block which are not stained glass window. Because these objects are very different (a contrejour imaging of darker pixels against the bright outside, not starting to explain even that the luminous saturated colors of the stain glass window may demand special treatment), we may desire to apply very different transformations to obtain a new encoding of the image such as e.g. Y_16b, at least for some categories of displays that signal is typcially intended or at least useful for. The window and the wall are very different objects, and in particular, they are illuminated differently. Not only is the wall (with whatever physical properties it has itself, such as a BDRF, albedo, etc.) illuminated by whatever light is in the interior of the room, but it typically creates its color/luminance by reflecting light from its surrounding, and in particular its main illuminating source(s). The window on the other hand is a translucent color, since it directly modulates by absorption the light from outside. At least one would like to see the window to be brighter in any display rendering, but there could be additional rendering quality criteria, in view of this different color generation mechanism. It could be that one wants to show on the HDR display the wall with relatively dim display output luminance, not too dissimilar from what an LDR would show, or a real wall would reflect being in the darkish viewing environment of the display and viewer. On the other hand, one may want to boost the glass window, which say is encoded in the LDR image with luma values not much higher than those of the wall, since otherwise an LDR display cannot show them (relatively faithful) anyway, onto lumas which are somewhere near the top of the realizable gamut of the HDR display, i.e. having a high luma Y_16b coordinate. I.e., an appropriate HDR image has to be constructed with darker walls, and very bright windows.

In FIG. 2b we show another example showing what to do with the stairs, and a total behavior luma mapping function TM_BLCK(i,j) is shown for what is desirable: in case any possible input luma Luma_in would be present for a pixel in that block, what is then the transformed output luma Luma_out of the HDR Y_16b image. Of course some colors are not present in actuality (in that block there is no stained glass window), so we have shown them dashed. What is relevant are the transformation functions for those ranges of Luma_in which are present. So the skilled person will understand that this allows for several embodiment realizations, based on i.a. desired versatility or coding complexity. One could store the entire function TM_BLCK(i,j) with the dashed parts given some values (since this is easily achieved if one encodes the transformation with a functional form such as a gamma function, but also if the transformation is encoded as a lookup table, and the intermediate values may come handy in parts of the image(s) where they are present), or one could store in separate locations only the subtransforms, such as the partial transform PD_BLCK(i,j) needed for the staircase defined over the luma_in range RNG_COD_DRK, Sewing together such partial transforms has many advantages. They may be stored anywhere and for any reason. One may understand that the partial transform PD_BLCK(i,j) may be stored somewhere (e.g. at the beginning of this shot of images, or even at the beginning of the movie) as a much larger transform which encodes the mapping behavior of the wallpaper, also in places where it is much lighter because it is e.g. illuminated by a local lamp in its vicinity. But then only the part within range RNG_COD_DRK is taken from that (and e.g. stored in a temporary memory when applying the luma mapping algorithm to all pixels of that block TM_BLCK(i,j)). Such partial transforms could even be delivered as e.g. an internet or other networked service, e.g. in a copyright protection service or just a separate service offering a more beautiful rendering of some objects, or in on-the-fly scenarios like gaming etc.

So TM_BLCK(i,j) of this example shows two relevant partial luma mappings, namely firstly the PD_BLCK(i,j) part for the stairs which is a linear stretch with offset, which brightens the stairs somewhat compared to their dark LDR image encoding (i.e. Luma_in), and then boosts the contrast somewhat, making the grains in the wood more visible. Secondly there is the partial transform PM_BLCK(i,j) for the room background there (which may in this case be some floor rather than wallpaper), which in this example is a varying (curved) stretch. The same mapping would typically be applicable to both parts of block BLCK(i+1, j−1).

If now however we arrive at block BLCK(i+2,j), that mapping strategy might still do very well for the background part, but not for the pixels with luma ins in the range RNG_COD_DRK, since they now encode the very dark object. This should be shown much darker on the HDR display, i.e. have lower luma_outs Y_16b in the HDR image mapped from the LDR image. That is shown by the thicker line which shows the new partial transform strategy PD_BLCK(i+2j) for that block, i.e. that different, new object in that block. It has a much gentler stretch factor, since it wants to keep all very dark object colors very dark, and almost indiscriminable.

Hence we need a new technical mechanism that allows for quickly changing such partial mapping strategies over parts of various blocks, which actually correspond to real objects requiring different optimal renderings or gradings.

Now the inventor has realized that in the HDR imaging world (i.e. typically involving mapping between different color representations of the same image(s) e.g. Y_8b to Y_16b—based color spaces) there is nearly always a special relation between such partial regions or objects within blocks, namely, their representative lumas (or luminances or similar representations) are different. A representative luma could be an average luma, but typically a tighter property is that the darkest luma of the first object (in the example of block BLCK(i+2,j) the background (floor)) is lighter/higher than the lightest luma of a pixel in the darker partial region (in this example of the very dark object). I.e., one may demarcate those two by merely encoding a "region differentiator grey value" for at least that block, and typically a number of blocks beyond (assuming a certain scan direction, e.g. left-to-right zigzag). That region differentiator grey value is hence a luma (or similar lightness coordinate of the color representation, in fact one can always re-encode it for different definitions of luminance ranges of images, just as one can redefine the mapping strategies from e.g. a [0,255] encoding to a [0.0, 1.0] encoding of the same image texture data) boundary below which the first object is encoded and above which the second object. And although the staircase in block BLCK(i+1,j−1) may need another region differentiator grey value, because those stairs contain some brighter values in the LDR image than the very dark object, the principle stays the same. For the stained glass window containing blocks the order is reversed and now the background is the darkest partial region in those blocks, but the principle stays the same. Having such a simple region differentiator grey value a receiving side apparatus can perfectly, pixel accurately reconstruct the necessary objects. This would not be possible in generic object oriented encoding, since e.g. a fish could contain e.g. blue colors in its interior also occurring in the ocean around it, but the HDR image representation problem is always one of having much lighter regions co-situated somewhere in the image with darker regions. This may typically happen because e.g. those regions are differently illuminated, or even are self-luminous like lamps. And another property is that such (very) different luminance regions are somewhat separated geometrically in the image, i.e. oftentimes in different blocks, which allows further optimization. This is the example of the very dark object, which is indeed darkish like the stairs, and may even use (some of) the same luma codes in the LDR image. But since it occurs in a different block, the only thing one needs to optimize is the representation semantics metadata, which can be as simple as a single region differentiator grey value, which may be e.g. in this example the upper value of RNG_COD_DRK. I.e. an object segmentation module on the receiving end (which may actually be the same kind of apparatus as at the sending end or exist at the sending end in fact, but it is a module which typically gets the LDR image+metadata containing the various needed one or more region differentiator grey values) can accurately segment all relevant objects based on the value of the region differentiator grey value it received before the first block with stairs started, and similarly for all consecutive blocks. At least this encoding will be used for all blocks containing stairs, i.e. until the very new situation occurs for the first time, in BLCK(i+2,j), where the very dark object resides. Before that block commences, the new situation is communicated by transmitting a new value of the region differentiator grey value. Now also at the receiving end the decoder is so reset and instructed with the new appropriate values, to do the segmentation again correctly, as would have been verified prior to finalizing the storing on the transmitting end. Typically the encoder may be connected with e.g. software that easily allows the grader to define relevant gTs values. E.g. he may have a slider to set a value, and then see in pseudocolors (e.g. red vs. green) which parts of the (perhaps local for selected blocks) scene are determined as below or above gTS. Or he may roughly select regions, and the apparatus may already semiautomatically aid the grader, analyse the statistics, and e.g. propose a first value of gTs based on an estimate of coherent regions which vary considerably in brightness. Or the grader may quickly scribble over a region, e.g. inside the stained glass window, and already select at least starting values for gTS therewith, which he might then finetune via any of various user interface controllers.

And once having these segments, it is an easy task to associate them with the required transformations. The decoder may e.g. label all background pixels as "object=0", and e.g. apply a global color or luma mapping strategy as encoded before the start of the picture (or even default for a type of reference HDR display, such as a gamma 4.0). Or the decoder (and encoder to first emulate the decodability) may before a particular block update the mapping to be applied for background/object=0 objects. The staircase may be labeled as "object=1", and some linking rule associates a mapping with those (segmented) pixels. E.g. the default rule may be that if a new mapping is encoded before the block, that mapping function (or algorithm) is to be applied for the pixel lumas which are below the current "region differentiator grey value". Or the mapping function may be encoded such, e.g. applicable over (mostly or only) such a luma range, that it is clearly to be used for the brighter object of the two (or more) regions.

So we need only a little bit of additional data to encode the objects, namely one or more times, depending on the complexity of the image, a region differentiator grey value. For the simplest images with e.g. only a window to the outside, a single gTs may suffice. We could even use that strategy to finetune mappings in case there is no clear luma discontinuity between the two partial regions, e.g. for illumination gradients along the background wallpaper one could use this mechanism with varying region differentiator grey values to apply somewhat different mappings to e.g. the darker lit parts, e.g. to modify visibility.

Several scenarios are possible. For most HDR scenes, there will only be two different lightness regions per block, and there may even by only a couple of different lightness regions, e.g. 2 (in case only the stained glass window needed a different mapping compared to a global mapping which is judged satisfactorily for the rest of the picture). In that case one would need only a couple of times to transmit a region differentiator grey value between the pixel color codes of the blocks (or similar codings, like e.g. outside the pixel data, in a data structure which is co-trackable with the scan of the blocks). Indeed in the simple scenario of the stained glass window a single region differentiator grey value may be sufficient, i.e. it might be co-encoded before the shot of images in the movie containing that scene. In that case the segmentation module will understand that every luma above the region differentiator grey value is supposed to be treated/mapped as a bright window. In some occasions there may be more than two objects overlapping with a single block location, in which case we will have a darker object, a middlebright one, and a lighter one. In that case they can be segmented by the same principle by transmitting two region differentiator grey values, e.g. before that block. One could do the same also in case only the darker object is in the current block (e.g. with the middlebright one), and the lighter object one occurs only a couple of blocks later, i.e. one co-encodes these two region differentiator grey values then for a run of say 10 successive blocks. There is only one unfrequently occurring scenario where two objects of similar brightness/luma occur in the same blocks, i.e. they have a number of pixels of the same luma, meaning they can't be definitely allocated to either object, or otherwise stated their encompassing ranges overlap (considerable, otherwise it is often also not so problematic). That would be the case if the dark object is: 1) really encoded with doubly allocated codes (i.e. one doesn't reserve e.g. only three codes, luma 0,1 and 2 for just our very dark object, which values are then not present in the stairs; and 2) those two objects are not separated as in our example, but collocated in the same block, e.g. typically overlapping. In that scenario and in case the content creator would still care about having such a high quality encoding of those dark regions anyway, our encoder would need to use a fallback scenario, e.g. in an HDR image encoding strategy, rather than to predict the whole picture by segment-local mappings based on our presently taught metadata-guided segmentation, we would need a different encoding, e.g. one could in addition co-encode a small image just the size of that block containing directly the required Y_16b values, and then superimpose those in the HDR image at the pixel locations of that blocks. And one could still use the region differentiator grey value mechanism for that by using particular reserved thresholds. E.g. a region differentiator grey value of zero or −1 would seem to "make no sense", because there are no lumas below that, i.e. it may signify the fallback (e.g. superimpose) encoding strategy. Apart from signaling a replacement HDR (or other image) encoding strategy, like e.g. encoding a small part of an image from a video not as Y_8b LDR, but a RAW partial e.g. Y_16b image, to be (also after appropriate transformation typically) substituted for that region of the image when generating a higher dynamic range image, one may also use reserved values for other reasons. E.g. a region differentiator grey value of 260 may indicate that the following block is so difficult to segment, it will not be possible based on one or more region differentiator grey values in the encoded luma range (e.g. 16, 200, and 240), but rather another segmentation strategy is needed. E.g. upon detecting this reserved value of 260, the receiving side may use an already segmented map for at least the current or more segmented blocks. I.e. it will then look in a small co-encoded segment image, in which for at least the successive blocks the pixels are labeled e.g. as either "0", "1", or "5", in case these are the three types of object present. After this fallback segmentation is no longer needed, the regular "region differentiator grey value"-based algorithm can be restarted by e.g. re-coding before the first block to which the regular segmentation will apply the old non-reserved values again (e.g. 16, 200, and 240), or, another reserved gTS code like 270 could be used to indicate that regular segmentation-metadata encoding resumes, and that the previous (typically stored in working memory at the receiving side) gTS values are applicable again.

But anyway, even when occasionally needing another fallback strategy for the rare very complex situations, we have an encoding which is very data-efficient (because mostly we need only the mappings and the region differentiator grey values demarcating on which pixels which mapping needs to be applied, and usually some further metadata for precisely specifying that link (e.g. transformation linking rule: object=3→use mapping=5)) because only very seldomly we need a more bits consuming alternative fallback coding. But furthermore it is also very versatile in processing applications, like e.g. tuning for rendering on different displays. Because by our method we have in an easy way defined the HDR semantics of the scene, which are needed for tuning towards different displays. And the linking rule may be dynamic, e.g. there may be a number of rules stored. E.g. mapping=5 may be further filled in by different mappings depending on e.g. which output HDR image color representation will be the result that is mapped to (e.g. Y_16b versus Y_10b), or which display it will be for (e.g. a 5000 nit HDR display, or a 50000 nit HDR display, or a 1500 nit HDR display), etc.

And the skilled person will understand that this encoding can be embodied in various ways, e.g. by different rules, e.g. changing at initialization the linking rule from "object=3→use mapping=5", into "object=3→use mapping=7", or by having the segmentation module produce different segment codes depending on the particulars of the output HDR image, or the mapping may be changed dynamically, e.g. by referring to further particulars (like a variable pointer to the start of different algorithms or LUTs or entries in lists of different equations etc.). This also allows e.g. for easy user interface command handling, such as e.g. a user-controlled modification of the "overall brightness look" of the scene, which can be implemented by re-allocating various new mapping functions to different objects of the scene, all objects/grey value regions being lightness-modified in a particular mapping relationship (e.g. the stained glass window may be largely unmodified, since it is already bright, perhaps brightened a little further compared to the rest of the image in order to not lose too much of the HDR look due to the luma ratio with the rest of the image, but the surrounding room interior may be brightened, since it is that average lightness part which mostly influences the image brightness look; and vice versa when dimming the display, because the user perceives it as uncomfortably bright e.g.). Only that overwritten part need then be treated differently, but if it is so difficult and critical, likely it will need complex rendering processing anyway. So the content creator has a much better say in what is e.g. brightened and how it is brightened, since brightening need not be a simple offset or multiplication, but can be a complex strategy balancing brightnesses of subregions (e.g. clipping a percentage of the pixels to white), which is typically smart in gamut-constrained display scenarios, where current algorithms may lead to artefacts.

Another very handy use of reserved segment demarcation thresholds is illustrated in the receiving side home system of FIG. 6. Here television 602 receives a signal SB, e.g. from a television station over the airways. It comprises in metadata METB, and HDR setting specification code(s) SET_HDR, which may be co-transmitted in various ways (but typically as metadata at the start of a run of images), and specifies how the display should hereafter behave. An interesting SET_HDR code may be used to switch between HDR and LDR rendering, fallback e.g. to save power, because we currently stream e.g. a studio news program, which doesn't need the maximal amount of HDR cinematic effects. So between e.g. the commercial or movie before it and the news, a SET_HDR code of "render_LDR" may be transmitted (or co-encoded in a stored video program on e.g. a home hard disk recorder, or internet-networked video storage server), which means that from thereonwards the HDR display will render with a maximal white brightness of e.g. only 500 nit (although it has a peak brightness capability of 5000 nit). Now as embodiments of our presently disclosed invention, one may easily do so by setting the region differentiator grey value gTR equal to 255, which signifies that all lumas below (i.e. all possible lumas in the 8 bit image) need to be treated with the same mapping, which may e.g. be a co-stored with the image, or prestored in the display gamma mapping which then renders everything to maximally 500 nit. E.g. one may use a gTS value which demarcates which grays will be rendered, perhaps dimmed, and above that all greys may be clipped to a relatively dark dimmed white.

Now it is important to understand that there are two kinds of mappings/transformations to apply to the lumas (or similar lightness-related codings).

The first are simple mathematical "hardware-related" mappings, which just correct for the particular viewing display and environment. E.g., if an image is encoded for a gamma 2.2 CRT (reference display), but shown on an LCD with a sigmoidal electro-optical transfer function, the display itself can use elementary colorimetric mathematics to correct for that, making the LCD render the image as if it was a reference CRT. Similarly one can largely optimize for viewing environment characteristics with simple mathematics. Firstly of course, when scaling to a darker rendering, one needs to bring down the reference brightness associated with the image coding. This is already largely realized by mapping the maximal code value (e.g. 255) to the peak brightness of the rendering display. However, it can also be done more complex, e.g. a particular subrange of lumas of the image could be allocated to a particular range of rendered luminances of the display. But typically also a gamma correction has to be applied, taking into account such things as a change in contrast depending on the luminance of the rendered image and its surround. This gives fairly acceptable results if the lightness range information content (i.e. the coding of information over the various appearance subranges) in the two systems is relatively similar, yet is difficult when the appearance ranges are very different. For going to a much narrower dynamic range one has to decide which subranges still have to be shown with what quality, i.e. typically with which intra-object contrast and which interobject contrast, and oftentimes overlapping ranges are generated by the mapping algorithm. The other way around is even more difficult. If we have only a couple of compressed object ranges, it is difficult to judge where to put them in an output HDR appearance range, let alone invent new luma/appearance values. It becomes even more difficult to generate a good, natural HDR image from an LDR mapped image in which 8 bit luma ranges of scene-luminance-dissimilar objects have been inappropriately encoded overlapping with each other (like when simulating very uniform illumination, destroying all or sufficient information of the original scene illumination).

All other transformations of the grey values (or in general colors) of the object pixels, can be seen as generic transformations, which may be local rather than global, which are typically done by an artist (he may even correct for if the above simple mathematical calibration for a different viewing scenario is not accurate enough). The artists may do very complex artistic gradings, in which they e.g. change the different lumas present in clouds in the picture, to make a storm look more menacing. Or they may even use a computer graphics rendering effect, to have light ray beams coming out of a robot's eyes, as represented by the desired pixel lumas/colors. For our discussion we can exemplify with two typical scenarios. Either all the important positioning on the luminance range of the object pixel grey values (the color grading) has been done on a master HDR image (IM_MSTR_HDR, see FIG. 4, which may be e.g. a 16 bit image with a particular defining gamma), and the LDR image (Im_1) is derived purely by simple mathematical transforms on that HDR master, like e.g. a gamma function of which the gamma factor is tuned based on such characteristics as the histogram of the HDR image, i.e. the HDR-to-LDR conversion is merely a simple suitable shifting of the grey values (typically over not to large deviations), so that all the information is relatively accurately contained, be it in a different coding strategy. In this case a final HDR image to be rendered on a HDR display can be derived from the LDR image by applying this inverse mathematical mapping strategy. Or, a human grader 520 may alternatively derive the LDR image based on a further optimally tuned grading starting from the master grading as encoded in the master HDR image IM_MSTR_HDR (i.e. he e.g. starts with the [0,1.0] image as if it was LDR and freely starts transforming it colorimetrically according to whatever are his tastes). I.e. in this scenario, there is both an encoding of the optimal look for HDR rendering systems in the HDR image IM_MSTR_HDR, and another optimal look for LDR systems, encoded in the graded LDR (e.g. advantageously 8 bit) image Im_1. Although our methods are applicable to any color or luma transformation for objects between a first and second color space definition for the pixel colors, typically of various bit depth and/or intended display peak brightness (the only thing needed that there is a good order relationship between brighter and darker regions in at least one of the color representations/image encodings), we will focus our exemplification on an example of the second type. I.e., the grader may have specified a lot of fine-tuned color mappings, i.e. of general luma_in to luma_out functional shape (e.g. as a LUT) for various sub-objects or regions of the image(s), which in our strategy will be converted to a series (one or more) of region differentiator grey values (gTS), a number of transformation functions or algorithms, and typically also one or more linking rules, linking obtainable segments with to be applied transformations (e.g. if there are three successive region differentiator grey values, the objects below the first gTS1 may be segmented as "0", above gTS1 as "1", and then if the second gTS2 is a higher value applicable to the same set of objects (i.e. the same luma range), above that gTS2 will be segments "2", but the below lumas already belong to "1". If the gTS2 is just a redefinition of darker and brighter objects, like in our very dark object example, the above the threshold lumas will in both cases be segment "1" backgrounds, but the lower lumas will be segment "0" respectively segment "2". If the relationships are clear, no further data needs to be co-encoded, but typically there may be some further metadata explaining the meaning of the region differentiator grey values. E.g. it may simply be sufficient to define the type of region differentiator grey values as "further_demarcation_in_same_luma_range", or "modified demarcation", etc. But for the more complex cases, and indeed because not so much additional data is needed an encoder may choose to do it always like this, one may just co-encode what has to be done for each situation, with e.g. segment value allocation rules. E.g. "if luma <gTS1→object/segment=0", if "luma >gTS2→ segment=2", etc. In this way one warrants against any possible misinterpretation and resulting incorrect transformation.

FIG. 3 elucidates one possible advantageous example of how to encode the above embodiments, fitting in the framework of current image encoding technologies, such as e.g. an MPEG video encoding standard like AVC, or similar.

One can start with putting some of the metadata in a global header Gen_Im_HDR (per picture, or for the first picture of a shot of pictures e.g.), which is typically useful for predominant transformations. E.g., for simple shots, it may suffice to encode herein a first mapping Glob_TM1 to be applied to most of the picture, and a second global mapping Glob_TM2 to be applied to some, e.g. much brighter regions. The first mapping could be applied to our room of FIG. 1a and FIG. 2b (i.e. everything being the background, staircase, and very dark object), and then the second mapping could be applied to brighten/boost the stained glass window. And the difference between these two objects is quickly found at the receiving side by means of the encoded region differentiator grey value gTS_glob (typically this window will have (much) higher lumas in the Y-8b LDR image than the rest of the object, but without this metadata, this may be very difficult to determine automatically). If one rotates the camera in the room, it may e.g. be that the stained glass window starts becoming brighter because more of the sun shines through. This can be encoded by gradually varying Glob_TM2 and possibly gTS_glob for successive images in the shot. This allows one e.g. to keep the encoding of the stained glass window in the Y_8b image the same over the successive images (e.g. using the best possible code allocation to retain the maximum amount of detail in the paintings on the stained glass), because one may boost the window brightness via the varying mapping Glob_TM2 (i.e. the illumination changes are in the functional transformation rather than in the pixelized texture color encoding). Then a number of pixel data blocks are encoded, e.g. via a DCT. If the global encoding is sufficient for the entire image, then all the pixel data follows that global header, up to the end of shot, or even movie clip. However, we assumed in this example that we have the more complex scenario where somewhere in the image, starting before a particular block (i−1,j−2), we have to start doing local transformations. I.e. typically we may still use some of the global transformation knowledge as already encoded in Glob_TM1 etc., e.g. for transforming the background pixels of the wallpaper, but we have to do for at least one local new object a new transformation. I.e. some of the transformation strategy will be redefined locally, e.g. overwritten. In this example the local metadata Loc_MET_1 contains a new strategy for demarcating the brighter parts above gTS_L_loc_1, e.g. because there is an even brighter object there like a light. Also a region differentiator grey value for determining one or more dark object(s) gTS_D_loc_1 is co-encoded. In the example, the light object can still be sufficiently transformed with the currently available and applicable transformation for bright regions, but a new mapping Loc_TM_DK is encoded for transforming the dark objects (e.g. here for the first time the staircase occurred, and we already knew how to transform the window and the wallpaper, but not yet the dark stairs). An example of a transformation linking rule LnkRL_1 is also co-encoded, which rule states that lumas below the dark object region differentiator grey value gTS_D_loc_1 are to be mapped with the transformation for the staircase Loc_TM_DK.

This information is again sufficient for a number of successive blocks (or in general a general defined shape), containing background, or stairs, until we end up before block (i+2,j), where we have to encode the region differentiator grey value gTS_D_loc_2 allowing segmentation of the very dark object, and its mapping strategy Loc_TM_DK_2. DAT_TM gives an order of the data, such as e.g. spatial (or temporal in transmission) order of blocks along a scan path, as is well known from image coding.

Although we have only described an interspersed example, we also intend to cover systems in which the metadata is physically detached from the pixel block data, yet associatable with particular block positions. Although some video encoding structures may perfectly encompass the above example (because they have already dedicated, or generic to be used at will metadata memory placeholders in place, other video encoding structures might not have enough metadata memory to store everything, or lose backwards compatibility by confusing older systems if some data is written interspersed. Therefore, other equivalent realizations could encode all the metadata (gTS etc.) in a separate part of the signal (e.g. at the beginning of a movie on a disk, or at regular intervals during broadcast etc.), and then make that data associatable by means of a geometric association code with particular blocks or other regions. The simplest way to do this is to write the number of the block (and potentially also the image number, movie/content number etc.) after the data, e.g. like: "gTS1=230/ImageNr/TimeCode=2541, Block_loc=(X=20, Y=12)". That separate metadata part may even e.g. reside in a different signal, and be supplied over a different means, e.g. the movie is put on a blu-ray in the player, but the metadata "explaining" it like the region differentiator grey value(s) are retrieved from a networked storage (e.g. a dedicated service allowing improved HDR rendering) over e.g. internet.

FIG. 4 shows how a segmentation will typically look, in which example we have also explained how e.g. the stained glass window can be subdivided in subregions, which would be useful e.g. if the lower part is less brightly illuminated, e.g. due to parts of the outside blocking some of the light. In that case a new segment type SEGM_TYP_2 will result, e.g. segment="5". We understand now how the segmentation rules by simple comparison with the optimally determined region differentiator grey values can easily generate objects of different lightness (typically different illumination in the HDR scene) that can accurately be segmented, irrespective of their relationship with the blocks. So one can encode all other useful data, such as currently to be used mappings, on a block basis, while the results are still applied object-accurate, i.e. without any haloing or block artefacts, etc.

We want to say a little more about the gTS values. We already mentioned that they can be defined irrespective of whatever the technical luma encoding being used, e.g. one can use luma gTS values in a gamma 2.2 YCrCb color space, or luminance Y differentiator values in an XYZ encoding of the image colors etc. Remains the interesting question whether the gTS values are defined in the reference color space of the first or the second image, e.g. the initial or final image. If one uses a mapped LDR representation to encode an HDR master grade, one would recover that HDR image by luminance upscaling mapping from that LDR image. So it would make sense to define the gTS values along the LDR image coding luma axis, although in principle in usual situations one might also specify them along the HDR luma axis, since via the inverse of the HDR recovering mapping functions those HDR-based gTS values could be converted in equivalent LDR-based gTS values. Typically metadata will at the beginning of the video encoding specify which definition is applicable. Now let's dive in a little deeper into what can in some scenarios happen for LDR-based gTS values. In principle one could have a mapping from master HDR to the second, LDR image which (slightly) overlaps the luma histograms of regions which in the original HDR image where separate (e.g. some of the darker parts of the stairs may obtain lumas in LDR which also occur in the very dark object). We could then specify the gTS differentiator halfway the overlapping histogram tails, or at a better luma position. Although in principle there could be issues when upscaling, this need not be an issue for several mapping strategies, in particular if they have relatively smooth behavior around the overlap (i.e. don't boost interpixel contrast). However, we will herebelow limit ourselves to systems which normally should have separate histograms in both the LDR and HDR image. The various apparatus embodiments can be constrained to take this constraint into account, e.g. by limiting the choice of HDR-to-LDR mapping a grader can choose, etc. This will be easy for non-compressed (by which we mean psychovisual spatial compression like frequency techniques like DCT, and not compression of a luma subrange) encodings. For compressed encodings we must be a little more careful with issues like e.g. the chessboard structures from incomplete DCT encoding. Although such need not always be a problem in practice, sometimes the artifact can become more severe visually, e.g. looking as a more noisy area. In particular this can happen if in the original uncompressed LDR the stairs and background histograms were separate (perhaps touching, or with some unused codes in between), but after DCT basis decomposition, recovered signals would have some darker chessboard spots from the brighter surround which fall into the subrange allocated for the darker stairs. If one also has a tone mapping curve which seriously stretches along that gTS value between stairs and background (e.g. a discontinuous function with a large offset between the two tone mapping parts) then it could be that those spots become significantly darker in the background at least near the stairs. Various apparatus (or method) embodiments can deal with such in several ways, and in particular a user interface may offer the grader different ways to interact with and specify this encoding behavior. Firstly, he may make the tone mapping curve less steep, and the apparatus may either initially offer him a choice of only less steep mappings, or may iteratively (at least one iteration) correct for those, by offering the grader to respecify the mappings only for regions where he judges the artifact as too severe. Also, the mapping may be such that there are some spare codes. In particular, one can easily define such behavior with two gTS values. FIG. 7 schematically illustrates such a scenario. In this graph Luma_in will be the lumas of the HDR image, and luma_out of the corresponding LDR encoding thereof, which we will send through a legacy MPEG encoder e.g. In the HDR image, the bright regions are of lumas/luminances far separated from the dark regions, which shows from their separation along the luma_in axis. In theory we could design a mapping which makes them touching along the Luma_out (LDR) axis, but now we design a mapping which leaves some range ProtRng of empty codes between them. These codes should not exist in the LDR encoding, but after DCT decompression some of the darker parts of the chessboards may fall into this ProtRng. The decoder can however recognize this, and remove them from the signal, e.g. by clipping them to the lowest Luma_out value of the bright range, prior to doing the luminance upscaling to recover the HDR image. With this principle we could even reduce that protective range ProtRng, even to such extent that some codes after DCT decompression may fall into the dark range of the LDR image, and be mapped (potentially far away from the bright range in the HDR image) by the inverse of the dark mapping MapDrk instead of the correct mapping for those pixels, namely the bright mapping MpBrght. But such DCT artefacts normally have a structure which goes over a couple of intermediate values to the darkest spots in the chess board. So the decoder may e.g. detect from those some incorrect values in the block detect that there may be a potential problem, and change after DCT decompression but prior to luminance upscaling such values to values in the bright range of the LDR image, even if those pixels actually pixels from the dark object, just to be on the safe side (a slightly incorrect HDR effect, but also no strong potential artifact). The encoder may use a reserved code for this "clip-to-range" (0 or 1), to indicate whether this should happen to a block, or whether it should be left alone and just upscaled, and the grader may indicate problematic blocks by e.g. clicking into them with his mouse or scribbling through a connected set of problematic blocks. Although the decoder may not know the difference, the encoder can having the original signal and all information determine whether such a problem can happen, so there may be a pseudocolor mode with which the grader may toggle between the incorrect pixels shown as e.g. bright saturated red, versus their actual color after (incorrect) reconstruction of the HDR image. Several other (interactive) options are available also, e.g. the encoder can use more DCT code words for blocks which were selected as problematic by the grader, or conversely less DCT blocks, so that there is still a lower frequency error, but the rapid chess patterns are removed in case such gives a better final look. Or e.g. a small change to the original data or DCT coefficients can be made, e.g. a counterpattern can be applied to the LDR block before it is DCT encoded, so that the lowest chessboard values don't fall into the dark LDR range anymore, etc.

FIG. 5 shows an example of a possible grading apparatus 510 at a content creation side, controlled by a grader 520 (the skilled person will understand how the same embodiment realizations of our invention would apply in e.g. a mathematical colorimetry-based automatic transcoding apparatus, or any other realization).

Inside the grading apparatus 510 is an image encoder 549 for encoding an image of a high dynamic range scene, which image may have been captured previously e.g. by a celluloid film or electronic digital camera system, to which special effects may have been added, and which in case of video may be an image in a final temporal composition sequence. The image encoder (which we now for simplicity assume to be a unit like an IC, but it may be a software suit, where some components may even run on a remote server, etc.) may typically comprise various subcomponents (typically under control of software, allowing the grader to choose parameters), and will typically comprise some variant of a pixel texture encoding unit 552, which is arranged to encode the colors of pixels of the image according to a particular defined image representation (Im_1), e.g. with lumas of N-bit code words, like e.g. 8 bit or 10 bit or 12 bit code words, and chrominance encodings like Y_Cr and Y_Cb. Since several encoding variants already exist, ranging over VC1, VP8, and similar MPEG-like encodings, upto even less popular fractal encoders, we will not further need to elucidate that aspect.

Comprised is also however an image analysis unit 550 which can apply more simple or more complex image analysis. In such professional grading apparatuses as shown in the example, typically a lot of software embodied algorithms are available, giving the grader nearly full control over the image, both when wanting to study its properties and composition, and when wanting to arbitrarily change it. He may e.g. use a pipette to sample a particular color (and can then define from that sampled pixel color a typical "object color" by e.g. choosing appropriate colorimetric bounds around the sampled color), or look at signal waveforms, or histograms, or other representations of regions (e.g. the system may map subranges of luma on top of a region, e.g. by pseudocolors). He may e.g. (temporally) brighten a particular region, to more clearly visually inspect its texture on one or more reference displays 530. He can typically apply a number of image processings, like sharpening a region, or applying a lighting effect, or another effect. He may demarcate an object by drawing a boundary around it with a lasso, etc.

Now typically the image analysis unit will at least convert an object into a region differentiator grey value (gTS), or in other words associate with an object at least one determined related gTS. It may e.g. determine the histogram of the selected object region, and determine that the minimal luma value it contains is higher than that of the surrounding region, e.g. the entire image. Interactive handling may be involved, e.g. the grader may first brighten the region, so that now its new minimal value is higher than the highest value in the rest of the image, or a relevant part thereof geometrically related to the object (e.g. bordering the object).

This region differentiator grey value gTS will be outputted to a formatter 554 which can (again following the rules of some image encoding standard, legacy or novel) co-encode in an output image signal (S(Im_1, MET(gTS)) the image representation (Im_1) and the region differentiator grey value (gTS), the latter typically in a pre-agreed textual metadata format. E.g. that image signal may be burned on a blu-ray disk 511, or saved onto some other memory like a network server's disk or solid state memory, or transmit the image signal in real time of a signal transmission connection, etc. It should be clear to the skilled person that although we described this functionality in the present physical construction, other realizations are possible.

Typically when grading on the grading apparatus the grader will simultaneously use its luma mapping determination unit 553 to determine a luma mapping (TOM) for at least some of the objects (the other objects then of course also having a transformation, perhaps an identity transformation, but that transformation may be e.g. default like predefined, or chosen by the rendering display etc.) He will define a mapping between pixel lumas as encoded in a first image representation (e.g. an input Y_16b HDR image) and lumas of the pixels in a second image representation (e.g. an LDR image Im_1), or the other way around. The luma mapping determination unit 553 may mathematically determine a mapping function by itself, e.g. proposing it as an initial suggestion to the grader, by looking at the various region's visual properties of e.g. the HDR image, and how they can still be reasonably represented in an LDR coding. This may result in applying e.g. a sigmoidal or multisegment mapping, with the curvings of the knees and shoulds e.g. determined by isolating particular sublobes of the global histogram, or image understanding such as face detection, or any variant thereupon. The grader may then finetune this function, e.g. by shifting or bending the shoulder of the sigmoid. In our method he may do this related to the gTS values. E.g. the grading apparatus may already define an important grey value (e.g. 999) which may be a control point for e.g. a part of a multisegment mapping curve, but the grader can then improve this point, e.g. shift it so that a more relevant portion of an object like e.g. the stairs is now transformed by a partial luma(/tone) mapping. We illustrate some aspects further with the example of FIG. 8. As already mentioned, we can use our method in a mere encoding method, e.g. in which an HDR image has to be encoded via an encoded, legacy useable LDR image (LDR container). In that situation there will typically only be some fixed functions for mapping between the two images. With FIG. 8 we describe however how our system can with the gTS values be used in a further scenario of display tunability, wherein further grades are determined for different displays, whether this information was all already graded (i.e. the grader at least checked how such transformations would look on a couple of very different reference displays like HDR, sub-LDR with a small dynamic range) and encoded in the image signal typically as various functions to be applied on one or more texture images (Im_1), or whether there was only data encoded for a good looking HDR grade and may be a good LDR grade, and at the rendering side a display system (e.g. display, or computer) is determining based upon that data and our gTS values at least one further grade for e.g. a medium dynamic range display MDR. In this graph, we use a final luminance representation which is absolute. Luminance_in can be the input signal as defined as it would look on e.g. some reference display, and luminance_out may be the output rendered luminances on various actual displays with differing brightness capabilities. We assume that the lower luminance objects are largely correctly encoded and therefore rendered, so both displays (Dis1, Dis2) will use the same tone mapping TM_FDrk, which may be an identity transform, or some contrast stretching. Now above gTSh1 start the bright regions in the image, and there are two bright regions (e.g. illuminated by setting sun up to gTSh2, and illuminated by strong football stadium lighting above gTSh2). Display 1 may have a very high peak brightness, so we have a lot of room for allocating bright subranges of it to various visual illumination classes. First brights processing tone mapping TM_TBri1_Dis1 may for that bright display considerably stretch the original data, so that that region looks nicely bright and contrasty. A second brights processing tone mapping TM_TBri2_Dis1 may even offset that region to very high rendered luminances, so that visually that region is very different from the sun-illuminated parts, e.g. the stadion lighting does indeed look very harsh. This discrimination can easily be done with the gTS values (e.g. in the example of this linear mapping they may even parametrize the mapping function). For a display with lesser peak brightness, the e.g. computer determining the final mapping can do something else for the various regions determined by the gTS values. E.g. it may process the lower brights with a less contrasty mapping function TM_Bri1_Dis2, so that there is still some room left for the stadion-light-lit regions, which need however to be soft-clipped with function TM-Bri2_Dis2.

This luma mapping (TOM) is finally co-encoded into the output image signal (S(Im_1, MET(gTS), TOM) by the formatter 554, according to agreed image signal defining specifications. Again, such a mapping may in principle map from using whatever first color encoding specification determining whatever first image for whatever first reference display (with in particular with whatever output luminance dynamic range) to similarly whatever second image encoding (in particular with higher or lower peak brightness, smaller or larger dynamic range, etc.), as long as it is clearly specified and agreed with the receiving side.

Typically an image encoder 549 which according to the embodiment concepts is arranged to co-encode smartly chosen region differentiator grey value(s) (gTS) is useful to demarcate regions of average brightness from regions of high brightness, i.e. e.g. the part of the luma histogram below a certain percentile, and a percentage of the highest values, especially when separated by unused codes (or a similar definition based on rendered luminances). This is hence very useful for HDR scene encoding, in whatever format/color space the image will finally be encoded in at least one version (e.g. Y_8b or Y_10b, or Y_16b, and further definitions like intended white luminance, black, gamma curve, etc.), since these HDR scenes typically don't have similar scene object luminances, and hence after camera capturing image lumas in view of the used uniform illumination by the lighting designers, as in LDR production, but rather they have very different illumination regions. And the gTS values can suitably characterize those.

So basically the grader just applies his classical operations on the image(s) like object selection, defining the optimal mapping curves for different parts (typical luma subranges) of that object etc., and the encoder 549 translates that into parameters of the embodiments of this invention, such as region differentiator grey values gTS.

We have elucidated the invention in FIG. 5 with an home entertainment content production system, e.g. having access to a video server 580 via a connection 581, which contains video files, such as a master HDR grading IM_MSTR_HDR of say some movie or television show, which was produced at the time of producing the movie or show, as being the ultimate reference grading. This will then be converted to a home cinema grading for a home version release, being encoded e.g. as an 8 bit MPEG-AVC image Im_1, and the metadata according to any of the presented embodiments. Of course the encoder may also be incorporated into another system, apparatus, or usage scenario, e.g. for determining one or more master grades directly from a raw camera signal from camera 501 over (e.g. wireless) image/video connection 505, or for remastering, etc.

FIG. 6 shows one possible embodiment of a receiving side system, namely a home consumer image or video rendering system. A television 602 may directly receive a first video (or image) signal SB(Im_1, MET) through e.g. the airways. This example video feed was already explained above, and uses the region differentiator grey values in between runs of images (typically going from one content to another, or parts of a program like reportings in a news program) which either should be rendered cinematically, with high brightness and HDR precision (i.e. also as to the precise allocation on the output luminance axis of several objects determining the look of the image), or should be run (near LDR) with reduced brightness (and power). There may also be a video processing apparatus 601 (like e.g. a settopbox or PC), which may get its video via one or more connections to the internet (I_net). E.g., a youtube server or similar may supply a HDR signal, which preferably is both simply encoded, and usable in a versatile manner for various different possible rendering displays (the so-called "display tunability" criterion). Apart from e.g. an Y_8b encoding Im_1 of the HDR signal, it will contain one or more of the above embodiment metadata, and e.g. also a processing indicator PROC_IND, which specifies how this image Im_1 may be processed, e.g. to obtain a HDR image version. E.g., it may specify that the receiving side may use several color/luma transformation strategies, e.g. with an indicator like "receiver_determines_optimal_mapping". In that case the receiving apparatus like the settopbox or tv may determine itself to apply a first mapping e.g. if the viewer has the lights switched on in his viewing room, and a second mapping if the lights are switched off. In fact, allowed processing may be specified in terms of tolerances or percentual changes, e.g. a rendering side apparatus may be allowed to apply a gamma function up to 1.2, but not stronger to a grade, e.g. if the display has a peak brightness within a range of that of the reference display (e.g. the grade may be determined for a 700 nit reference display, and allowed to be slightly modifiable if the actual display is within a range of 50% thereof, i.e. with a peak brightness between 350 and 1050 nit). The processing indicator may also specify that only one or one of a couple of specifically determined transformations may be used, etc. The indicator may have a variable definition, which may become complex, e.g. it may comprise detailed guidelines for user interface control, guiding the viewer through selections to have an optimal look of the movie (giving him some creator-approved optimization options, like a couple of ways to improve the darks, making them more colorful but somewhat diminishing the mood of the image), as desired by the content creator (manual calibration with selected subsets of images e.g.), etc. Normally there will be fallback scenarios, as the viewer has ultimate control, so these guidelines can be ignored or overruled, but the present embodiments do allow for a high degree of versatility, like e.g. a closer say by the content creator on how his content is to be rendered in the final rendering environment (whether home, cinema, outdoors, professional display at e.g. a soccer stadium, etc.).

The image decoder 605 may typically comprise several of the following units. A pixel texture decoding unit 608 needs to be arranged so that it can perform any mathematics necessary to decode the incoming image signals, which may be encoded according to many standards, so e.g. software may be run, which can be upgraded if a new wavelet encoder gets released. Of course there will be signal unpacking and may be demodulation etc. (which will typically be done by a deformatter 607, together with extracting, and potentially decoding also the metadata like the region differentiator grey value(s)), but the pixel texture decoding unit 608 will be able to do such things as e.g. arithmetic decoding, inverse DCT decoding, etc., like all the components in MPEG-visual standards, and similar. An image segmentation unit 606 will do the segmentation, and as said, that can be easily done by thresholding from the gTS values, but more complicated segmentation strategies may also be supported. Then a pixel color transformation unit 609 will perform the mapping of at least the pixel lumas, which may be as simple as recoding e.g. the output value of the function PD_BLCK(i+2,j) belonging to the pixel luma value of that particular Im_1 pixel as input value (Luma_in). This output value will be written in the HDR output image IM_RC_HDR at that pixel location. That image may be the one sent over a connection 688 to the tv (e.g. for direct driving or further processing by an image processing unit 620 in the tv or in general display, which is also capable of doing color transformations).

There may be an intermediate image IM_INTRM involved, and although this may be any reference representation, we currently assume for simple explanation it is a 8 bit luma image (with also 8 bit words for two color channel representations). If the input image representation Im_1 is not (e.g. DCT) compressed, then this may be a simple copy of Im_1, and otherwise it is typically the resulting image from decompression.

The system also shows home networking video distribution via a networking communication linking means like antenna 699 to a portable display 630 (e.g. an IPAD which the viewer uses to continue watching tv in his bed in his bedroom). This nicely illustrates the versatility of the embodiments, since the apparatus 601 may then precondition another image signal IM_RC_MDR optimally for this device, which may e.g. only have a medium dynamic range, between LDR (which we may define ends approximately above 750 nit peak brightness) and high quality HDR, which starts above say 2500 nit. The MDR image can then be encoded in IM_RC_MDR by using even the same Im_1 for the pixel textures, and the same region differentiator grey value(s), but changed mapping functions for mapping to the different range of display rendered output luminances.

The present embodiments also allow for improved user-interface interactivity at the rendering side, since the viewer may e.g. tune his mapping functions parametrically. E.g. brightening the very dark object may be as simple as controlling the slope of the function PD_BLCK(i+2,j). Smart algorithms may apply coordinated luma modifications to all objects in the image(s) in aesthetic synchrony at the touch of a single button (enabling e.g. a smart brightness function), but it is also possible to enable control of the various objects by offering a more complex user interface. E.g., when watching t.v., the user may use his portable display 630 as a remote control, and have a copy of the image of the tv on the display of that remote control, with the various significant objects already preselected with the region differentiator grey value methods. The viewer can then quickly with (e.g. some sliders popping up on top of the objects) a couple of changes indicate his preferential rendering on one or a couple of images (e.g. at the start of the movie, some important characteristic scenes, or under a pause command, the current image for that to be played scene). An undo button may restore the situation etc. Artificial intelligence can be used to deduce the viewers preferences from his actions, even by storing specifics for unrelated programs at very different playing times like on different days. The system may hence infer that the viewer likes his blacks pitch black, or conversely brightened up, and then apply this knowledge to other images.

The algorithmic components disclosed in this text may (entirely or in part) be realized in practice as hardware (e.g. parts of an application specific IC) or as software running on a special digital signal processor, or a generic processor, etc. They may be semi-automatic in a sense that at least some user input may be/have been (e.g. in factory, or consumer input, or other human input) present.

It should be understandable to the skilled person from our presentation which components may be optional improvements and can be realized in combination with other components, and how (optional) steps of methods correspond to respective means of apparatuses, and vice versa. The fact that some components are disclosed in the invention in a certain relationship (e.g. in a single figure in a certain configuration) doesn't mean that other configurations are not possible as embodiments under the same inventive thinking as disclosed for patenting herein. Also, the fact that for pragmatic reasons only a limited spectrum of examples has been described, doesn't mean that other variants cannot fall under the scope of the claims. In fact, the components of the invention can be embodied in different variants along any use chain, e.g. all variants of a creation side like an encoder may be similar as or correspond to corresponding apparatuses at a consumption side of a decomposed system, e.g. a decoder and vice versa. Several components of the embodiments may be encoded as specific signal data in a signal for transmission, or further use such as coordination, in any transmission technology between encoder and decoder, etc. The word "apparatus" in this application is used in its broadest sense, namely a group of means allowing the realization of a particular objective, and can hence e.g. be (a small part of) an IC, or a dedicated appliance (such as an appliance with a display), or part of a networked system, etc. "Arrangement" or "system" is also intended to be used in the broadest sense, so it may comprise inter alia a single physical, purchasable apparatus, a part of an apparatus, a collection of (parts of) cooperating apparatuses, etc.

The computer program product denotation should be understood to encompass any physical realization of a collection of commands enabling a generic or special purpose processor, after a series of loading steps (which may include intermediate conversion steps, such as translation to an intermediate language, and a final processor language) to enter the commands into the processor, to execute any of the characteristic functions of an invention. In particular, the computer program product may be realized as data on a carrier such as e.g. a disk or tape, data present in a memory, data traveling via a network connection—wired or wireless-, or program code on paper. Apart from program code, characteristic data required for the program may also be embodied as a computer program product. Such data may be (partially) supplied in any way.

The invention or any data usable according to any philosophy of the present embodiments like video data, may also be embodied as signals on data carriers, which may be removable memories like optical disks, flash memories, removable harddisks, portable devices writeable via wireless means, etc.

Some of the steps required for the operation of any presented method may be already present in the functionality of the processor or any apparatus embodiments of the invention instead of described in the computer program product or any unit, apparatus or method described herein (with specifics of the invention embodiments), such as data input and output steps, well-known typically incorporated processing steps such as standard display driving, etc. We also desire protection for resultant products and similar resultants, like e.g. the specific novel signals involved at any step of the methods or in any subpart of the apparatuses, as well as any new uses of such signals, or any related methods.

It should be noted that the above-mentioned embodiments illustrate rather than limit the invention. Where the skilled person can easily realize a mapping of the presented examples to other regions of the claims, we have for conciseness not mentioned all these options in-depth. Apart from combinations of elements of the invention as combined in the claims, other combinations of the elements are possible. Any combination of elements can be realized in a single dedicated element.

Any reference sign between parentheses in the claim is not intended for limiting the claim, nor is any particular symbol in the drawings. The word "comprising" does not exclude the presence of elements or aspects not listed in a claim. The word "a" or "an" preceding an element does not exclude the presence of a plurality of such elements.

The invention claimed is:

1. An image decoder, comprising:
a pixel texture decoder configured to obtain pixel colors of pixels of a decoded image from an encoded image representation of a high dynamic range scene; and
a deformatter configured to extract a region differentiator grey value from a metadata of the encoded image representation, wherein the region differentiator grey value includes a predetermined luma value for separating lumas of all pixels of a first object from lumas of all pixels of a second object in a least one block of the encoded image.

2. The image decoder as claimed in claim 1, further comprising a pixel color transformer configured to apply a first color transform for transforming at least luma values of the pixel colors to pixels in the segment of lower luma, wherein the pixel color transformer is further configured to apply a second color transform for transforming at least luma values of the pixel colors to pixels in the segment of higher luma.

3. The image decoder as claimed in claim 2, wherein the pixel color transformer is configured to apply the first color transform or the second color transform for transforming at least luma values of the pixel colors to pixels in the segment of lower luma or higher luma, respectively, below or above the region differentiator grey value.

4. The image decoder as claimed in claim 1, further comprising a transformation determination unit configured to select a pixel color transformation strategy from a memory source not associated with any of the data of the encoded image representation.

5. The image decoder as claimed in claim 4, wherein the transformation determination unit is configured to determine the pixel color transformation strategy based on at least one parameter of a rendering environment or a level of surround illumination.

6. The image decoder as claimed in claim 1, wherein the image decoder is configured to obtain the encoded image representation and the region differentiator grey value from physically separate memories, and wherein the image decoder is further configured to associate the region differentiator grey value with a geometrical part of the encoded image representation.

7. The image decoder as claimed in claim 1, in which the pixel texture decoder is configured to perform a DCT-based image decoding.

8. The image decoder as claimed in claim 1, wherein the deformatter is configured to extract a luminance mapping from the metadata of the encoded image representation.

9. A method for decoding an encoded image representation, comprising:
obtaining pixel colors of pixels of a decoded image from the encoded image representation of a high dynamic range scene; and
extracting a region differentiator grey value from a metadata of the encoded image representation, wherein the region differentiator grey value includes a predetermined luma value for separating lumas of all pixels of a first object from lumas of all pixels of a second object in at least one block of the encoded image.

10. The method as claimed in claim 9, further comprising applying a first color transform for transforming at least luma values of the pixel colors to pixels in the segment of lower luma, and applying a second color transform for transforming at least luma values of the pixel colors to pixels in the segment of higher luma.

11. The method as claimed in claim 10, comprising applying the first color transform or the second color transform for transforming at least luma values of the pixel colors to pixels in the segment of lower luma or higher luma, respectively, below or above the region differentiator grey value.

12. The method as claimed in claim 9, further comprising selecting a pixel color transformation strategy from a memory source not associated with any of the data of the encoded image representation.

13. The method as claimed in claim 9, further comprising determining the pixel color transformation strategy based on at least one parameter of a rendering environment or a level of surround illumination.

14. The method as claimed in claim 9, further comprising obtaining the encoded image representation and the region differentiator grey value from physically separate memories, and associating the region differentiator grey value with a geometrical part of the encoded image representation.

15. The method as claimed in claim 9, further comprising performing a DCT-based image decoding.

16. The method as claimed in claim 9, further comprising extracting a luminance mapping from the metadata of the encoded image representation.

* * * * *